(12) United States Patent
Sato et al.

(10) Patent No.: US 12,158,613 B2
(45) Date of Patent: Dec. 3, 2024

(54) OPTICAL CONNECTOR SWITCHES, SYSTEMS, AND METHODS

(71) Applicant: Sanwa Technologies, Inc., Plano, TX (US)

(72) Inventors: Takashi Sato, Tokyo (JP); Akihito Ishikawa, Allen, TX (US); Tomoaki Kaga, Frisco, TX (US)

(73) Assignee: Sanwa Technologies, Inc., Plano, TX (US)

( * ) Notice: Subject to any disclaimer, the term of this patent is extended or adjusted under 35 U.S.C. 154(b) by 0 days.

(21) Appl. No.: 17/591,281

(22) Filed: Feb. 2, 2022

(65) Prior Publication Data

US 2023/0244036 A1    Aug. 3, 2023

(51) Int. Cl.
*G02B 6/35*    (2006.01)

(52) U.S. Cl.
CPC ............. *G02B 6/353* (2013.01); *G02B 6/358* (2013.01)

(58) Field of Classification Search
CPC ..... G02B 6/3825; G02B 6/3564; G02B 6/358
See application file for complete search history.

(56) References Cited

U.S. PATENT DOCUMENTS

| | | |
|---|---|---|
| 4,674,831 A | 6/1987 | Bagby |
| 4,705,348 A | 11/1987 | Matsunaga et al. |
| 4,738,506 A | 4/1988 | Abendschein et al. |
| 4,934,785 A | 6/1990 | Mathis et al. |
| 4,989,946 A | 2/1991 | Williams et al. |
| 5,031,994 A | 7/1991 | Emmons |
| 5,046,806 A | 9/1991 | Kidder et al. |
| 5,170,446 A | 12/1992 | Sullivan et al. |
| 5,212,744 A | 5/1993 | Ohnuki |
| 5,239,599 A | 8/1993 | Harman |
| 5,721,794 A | 2/1998 | Uchiyama et al. |
| 5,784,516 A | 7/1998 | Parzygnat et al. |
| 6,144,782 A * | 11/2000 | Takahashi ............ G02B 6/3502 385/20 |
| 6,181,847 B1 | 1/2001 | Baker et al. |
| 6,208,777 B1 | 3/2001 | Jing |
| 6,259,835 B1 | 7/2001 | Jing |
| 6,307,982 B1 * | 10/2001 | Takahashi ............ G02B 6/3508 385/16 |
| 6,335,993 B1 | 1/2002 | Takahashi |
| 6,360,032 B1 | 3/2002 | Berger et al. |
| 6,424,759 B1 | 7/2002 | Jing |

(Continued)

OTHER PUBLICATIONS

International Search Report and Written Opinion for Application No. PCT/US2023/060441, mailed May 3, 2023, 13 pages.

*Primary Examiner* — Omar R Rojas
(74) *Attorney, Agent, or Firm* — Haynes and Boone, LLP

(57) ABSTRACT

A fiber optic connector may include a body, at least one input coupling configured to receive at least one fiber optic input cable, at least one output coupling configured to receive at least one fiber optic output cable, and at least one shuttle. The shuttle may be movable within the body between a connected position and a disconnected position, wherein the at least one fiber optic input cable and the at least one fiber optic output cable are optically connected when the at least one shuttle is in the connected position, and wherein the at least one fiber optic input cable and the at least one fiber optic output cable are not optically connected when the at least one shuttle is in the disconnected position.

28 Claims, 21 Drawing Sheets

(56) References Cited

U.S. PATENT DOCUMENTS

| | | |
|---|---|---|
| 6,516,128 B2 | 2/2003 | Hwang |
| 6,554,484 B2 | 4/2003 | Lampert et al. |
| 6,652,155 B2 | 11/2003 | Lampert |
| 6,688,781 B2 | 2/2004 | Anderson et al. |
| 6,901,204 B2 | 5/2005 | Hong et al. |
| 6,965,720 B2 | 11/2005 | Melnyk et al. |
| 6,990,267 B2 | 1/2006 | Harman et al. |
| 7,040,814 B2 | 5/2006 | Morimoto et al. |
| 7,171,121 B1 | 1/2007 | Skarica et al. |
| 7,338,217 B2 | 3/2008 | Morimoto et al. |
| 7,412,147 B2 | 8/2008 | Scadden |
| 7,418,167 B2 * | 8/2008 | Dames ............ G02B 6/3564 385/16 |
| 7,587,116 B2 | 9/2009 | Scadden |
| 7,702,193 B2 * | 4/2010 | Arol ............... G02B 6/3508 398/56 |
| 8,068,715 B2 * | 11/2011 | Kewitsch ......... G02B 6/4452 385/17 |
| 8,798,431 B2 | 8/2014 | Julien et al. |
| 9,274,300 B2 | 3/2016 | Miller et al. |
| 9,310,577 B2 | 4/2016 | Coffey et al. |
| 9,335,484 B2 | 5/2016 | Pepe et al. |
| 9,703,060 B2 | 7/2017 | Kewitsch |
| 9,733,433 B2 | 8/2017 | Kato et al. |
| 9,736,556 B2 | 8/2017 | Lingampalli |
| 9,759,884 B2 | 9/2017 | Coffey et al. |
| 9,772,450 B2 | 9/2017 | Pepe et al. |
| 9,985,723 B2 | 5/2018 | Vastmans et al. |
| 10,598,864 B2 | 3/2020 | Royer et al. |
| 11,115,735 B2 * | 9/2021 | Rousseaux ......... H04Q 11/0005 |
| 2003/0169960 A1 | 9/2003 | Zhou |
| 2003/0202737 A1 | 10/2003 | Zhou |
| 2004/0165851 A1 | 8/2004 | Daoud |
| 2005/0226587 A1 | 10/2005 | Minota et al. |
| 2005/0232565 A1 | 10/2005 | Heggestad et al. |
| 2013/0077914 A1 | 3/2013 | Durrant et al. |
| 2015/0198768 A1 | 7/2015 | Sluz et al. |
| 2015/0355428 A1 | 12/2015 | Leeman et al. |
| 2016/0202424 A1 | 7/2016 | Kewitsch et al. |
| 2017/0003459 A1 | 1/2017 | Takeuchi et al. |
| 2017/0289653 A1 | 10/2017 | Tsuzaki et al. |
| 2017/0366882 A1 | 12/2017 | Lingampalli |
| 2018/0077472 A1 | 3/2018 | Raza et al. |
| 2020/0049896 A1 | 2/2020 | Dannoux et al. |

* cited by examiner

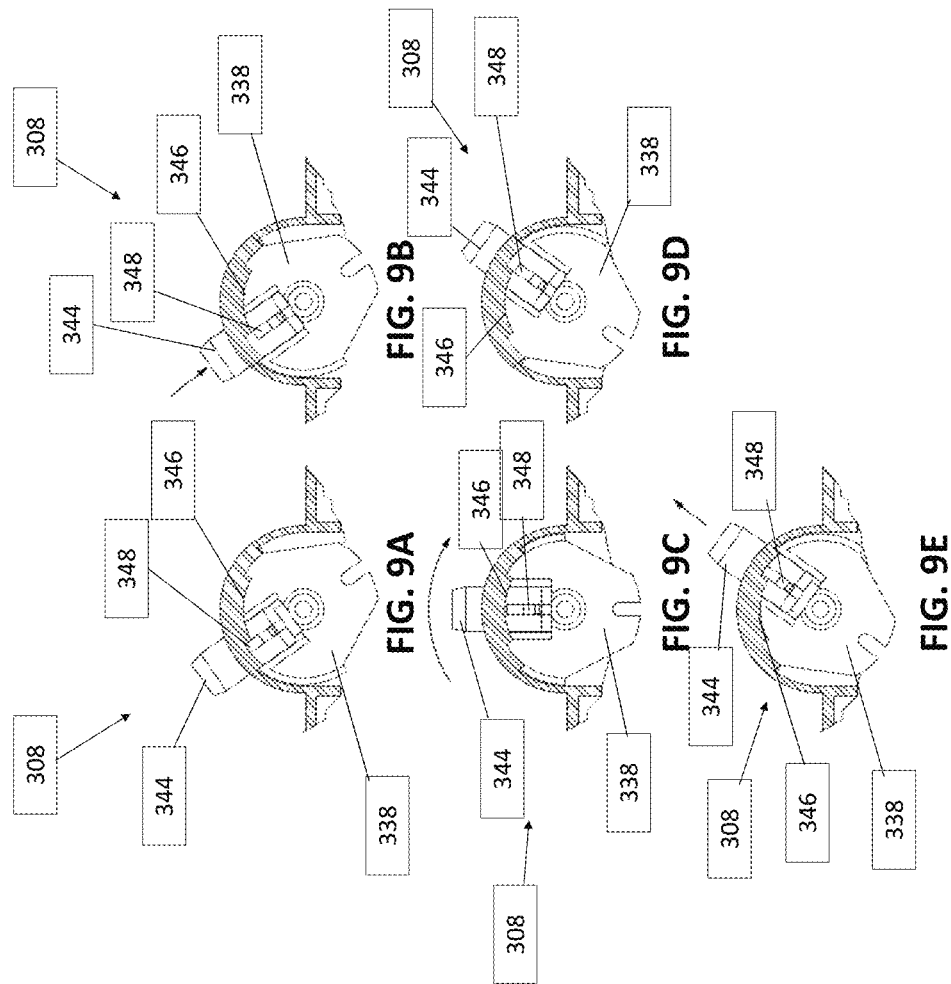

OPTICAL CONNECTOR SWITCHES, SYSTEMS, AND METHODS

TECHNICAL FIELD

This disclosure relates in general to systems and methods for connecting and disconnecting fiber optic cables in network distribution systems. More particularly, in some implementations, this disclosure relates to systems and methods for connecting and disconnecting an optical connection between a fiber optic input cable and a fiber optic output cable using a fiber optic connector including a built-in switch.

BACKGROUND

Fiber optic network distribution systems generally include a plurality of fiber optic cables which may be from a plurality of service providers. The fiber optic cables are configured to carry data in the form of light signals and as such require specialized connections at points of termination of each fiber optic cable so that the light signals are properly transmitted. The fiber optic cables may carry the light signals from points or origin, such as a service provider, to points of use, such as a data center network cabinet or a patch panel, each housing a plurality of fiber optic cables and connection points.

To connect or disconnect service to a user, or to switch service providers at a point of service, the fiber optic cables may be spliced or terminated with a connector or type of coupler that requires a technician to manually insert and/or remove the desired fiber optic cable from the point of service. Additionally, splicing and/or adding a connector/coupler to the fiber optic cables typically requires specialized training and equipment, and may require substantial time to complete, even for a relatively simple service provider switching service.

Accordingly, the above-mentioned conventional systems all have shortcomings that continue to make connecting/disconnecting and switching of service providers using fiber optic cables difficult. The present disclosure overcomes one or more shortcomings in the art.

SUMMARY

The methods and systems disclosed herein include a fiber optic cable connection system that allows rapid and efficient connection and disconnection of fiber optic cables. One embodiment includes a fiber optic connector that includes a body, at least one input coupling configured to receive at least one fiber optic input cable, at least one output coupling configured to receive at least one fiber optic output cable, and at least one shuttle. The shuttle may be movable within the body between a connected position and a disconnected position, wherein the at least one fiber optic input cable and the at least one fiber optic output cable are optically connected when the at least one shuttle is in the connected position, and wherein the at least one fiber optic input cable and the at least one fiber optic output cable are not optically connected when the at least one shuttle is in the disconnected position.

In some examples, the present disclosure is directed to a fiber optic connector that includes a body, at least one input coupling configured to optically communicate with at least one fiber optic input cable, at least one output coupling configured to optically communicate with at least one fiber optic output cable, and at least one shuttle moveable within the body between a connected position and a disconnected position. The at least one fiber optic input cable and the at least one fiber optic output cable may be optically connected when the at least one shuttle is in the connected position. The at least one fiber optic input cable and the at least one fiber optic output cable are not optically connected when the at least one shuttle is in the disconnected position.

In some aspects, the at least one shuttle includes one of the input coupling and the output coupling. In some aspects, at least one of the at least one input coupling and the at least one shuttle is connected to at least one selector, wherein the at least one selector is configured to move between an on position and an off position. The at least one selector may be configured to cause the at least one shuttle to move to the connected position when the at least one selector is in the on position, and the at least one selector may be configured to cause the at least one shuttle to move to the disconnected position when the at least one selector is in the off position. In some aspects, the at least one selector comprises at least one of a rack and pinion selector comprising at least a portion of the at least one shuttle, a rotatable lever connected to the at least one shuttle, a slider selector, and a push button selector. In some aspects, the at least one selector includes a locking feature configured to inhibit movement of the at least one selector from one of the on position and the off position when the locking feature is enabled. In some aspects, the fiber optic connector may include at least one input coupling shutter extending through at least a portion of the at least one input coupling and at least one output coupling shutter extending through at least a portion of the at least one output coupling. Each of the at least one input coupling shutter and the at least one output coupling shutter may comprise at least one of a dust protection shutter and a light protection shutter. The dust protection shutter may be configured to inhibit an intrusion of dust into the body, and the light protection shutter may be configured to inhibit a transmission of light through at least one of the at least one input coupling and the at least one output coupling. In some aspects, the fiber optic connector may further comprise at least one shuttle actuator connected to the at least one shuttle and configured to move the at least one shuttle between the connected position and the disconnected position using at least one of electrical energy, mechanical energy, and potential energy. In some aspects, the fiber optic connector may further comprise at least one photo detector connected to the fiber optic connector. The at least one photo detector may be configured to determine a connectivity between the at least one fiber optic input cable and the at least one fiber optic output cable. In some aspects, the fiber optic connector may further comprise at least one fiber optic coupler extending between the at least one shuttle and one of the at least one input coupling and the at least one output coupling. In some aspects, the fiber optic connector may further comprise a plurality of connected bodies. In some aspects, the body may be at least one of cylindrical, rectangular, spherical, and tapered. In some aspects, at least one of the at least one input coupling and the at least one output coupling includes a sealing feature configured to interface with a respective one of the at least one fiber optic input cable and the at least one fiber optic output cable to inhibit fluid intrusion into an inner cavity of the body of the fiber optic connector. In some aspects, the body includes mounting features configured to interface with a distribution bank mount. In some aspects, the body includes a top cassette housing and a bottom cassette housing. In some aspects, each of the at least one input coupling and the at least one output coupling comprises at least one of a small form factor connector and a multi-fiber connector. In some aspects, the at least one selector is a lever as a rotation rod, a biasing member, and a lever cap.

In an exemplary aspect, a fiber optic network distribution system may include a distribution bank, at least one fiber optic input cable, at least one fiber optic output cable, and at least one fiber optic connector positioned within the distribution bank. The at least one fiber optic connector may include a body, at least one input coupling configured to optically communicate with at least one fiber optic input cable, at least one output coupling configured to optically communicate with at least one fiber optic output cable, and at least one shuttle moveable within the body between a connected position and a disconnected position. The at least one fiber optic input cable and the at least one fiber optic output cable may be optically connected when the at least one shuttle is in the connected position, and the at least one fiber optic input cable and the at least one fiber optic output cable may be not optically connected when the at least one shuttle is in the disconnected position.

In some aspects, the at least one shuttle includes one of the input coupling and the output coupling. In some aspects, at least one of the at least one input coupling and the at least one shuttle may be connected to at least one selector, and the at least one selector may be configured to move between an on position and an off position. The at least one selector may be configured to cause the at least one shuttle to move to the connected position when the at least one selector is in the on position, and the at least one selector may be configured to cause the at least one shuttle to move to the disconnected position when the at least one selector is in the off position. In some aspects, the at least one selector comprises at least one of a rack and pinion selector comprising at least a portion of the at least one shuttle, a rotating lever-arm connected to the at least one shuttle, a slider selector, and a push button selector. In some aspects, the at least one selector includes a locking feature configured to inhibit movement of the at least one selector from one of the on position and the off position when the locking feature is enabled. In some aspects, the fiber optic network distribution system may further comprise at least one input coupling shutter extending through at least a portion of the at least one input coupling and at least one output coupling shutter extending through at least a portion of the at least one output coupling, wherein each of the at least one input coupling shutter and the at least one output coupling shutter comprises at least one of a dust protection shutter and a light protection shutter, wherein the dust protection shutter is configured to inhibit an intrusion of dust into the body, and wherein the light protection shutter is configured to inhibit a transmission of light through at least one of the at least one input coupling and the at least one output coupling. In some aspects, the fiber optic network distribution system may further comprise at least one shuttle actuator connected to the at least one shuttle and configured to move the at least one shuttle between the connected position and the disconnected position using at least one of electrical energy, mechanical energy, and potential energy. In some aspects, the fiber optic network distribution system may further comprise at least one photo detector connected to the fiber optic connector, wherein the at least one photo detector is configured to determine a connectivity between the at least one fiber optic input cable and the at least one fiber optic output cable. In some aspects, the fiber optic network distribution system may further comprise at least one fiber optic coupler extending between the at least one shuttle and one of the at least one input coupling and the at least one output coupling. In some aspects, the fiber optic network distribution system may further comprise a plurality of connected bodies. In some aspects, the body is at least one of cylindrical, rectangular, spherical, and tapered. In some aspects, at least one of the at least one input coupling and the at least one output coupling includes a sealing feature configured to interface with a respective one of the at least one fiber optic input cable and the at least one fiber optic output cable to inhibit fluid intrusion into an inner cavity of the body of the fiber optic connector. In some aspects, the body includes mounting features configured to interface with a distribution bank mount.

In yet another aspect, the present disclosure is directed to a method of connecting fiber optic cables in a network distribution system. The method may include: positioning a fiber optic connector within a distribution bank; connecting a fiber optic input cable to an input coupling of the fiber optic connector; connecting a fiber optic output cable to an output coupling of the fiber optic connector; and moving a shuttle within a body of the fiber optic connector from a disconnected position to a connected position. The fiber optic input cable and the fiber optic output cable may be optically connected when the shuttle is in the connected position, and the fiber optic input cable and the fiber optic output cable may be not optically connected when the shuttle is in the disconnected position.

In yet another aspect, the present disclosure is directed to a method of providing data service in an optical network distribution system. The method may include: providing a fiber optic distribution bank having a plurality of switches to connect and disconnect a fiber optic cable from a central fiber optic input cable to a plurality of fiber optic output cables; and throwing a switch to connect one or more of the fiber optic output cables to the fiber optic input cable. Throwing a switch may comprise moving a shuttle within a body of a fiber optic connector from a disconnected position to a connected position. The fiber optic input cable and the fiber optic output cable may be optically connected when the shuttle is in the connected position, and the fiber optic input cable and the fiber optic output cable may be not optically connected when the shuttle is in the disconnected position.

Additional embodiments and methods of use are contemplated herein.

Further objects, forms, implementations, aspects, features, benefits, and advantages of the present disclosure shall become apparent from the detailed drawings and descriptions provided herein.

BRIEF DESCRIPTION OF THE DRAWINGS

FIG. 9A is an illustration of a front view of the exemplary selector shown in FIG. 8 in an off position according to an exemplary implementation of the present disclosure.

FIG. 9B is an illustration of a front view of the exemplary selector shown in FIG. 8 in an off position with an exemplary lever cap in a depressed position according to an exemplary implementation of the present disclosure.

FIG. 9C is an illustration of a front view of the exemplary selector shown in FIG. 8 in a transition position according to an exemplary implementation of the present disclosure.

FIG. 9D is an illustration of a front view of the exemplary selector shown in FIG. 8 in an on position with the exemplary lever in the depressed position according to an exemplary implementation of the present disclosure.

FIG. 9E is an illustration of a front view of the exemplary selector shown in FIG. 8 in the on position according to an exemplary implementation of the present disclosure.

DETAILED DESCRIPTION

Figure 1:
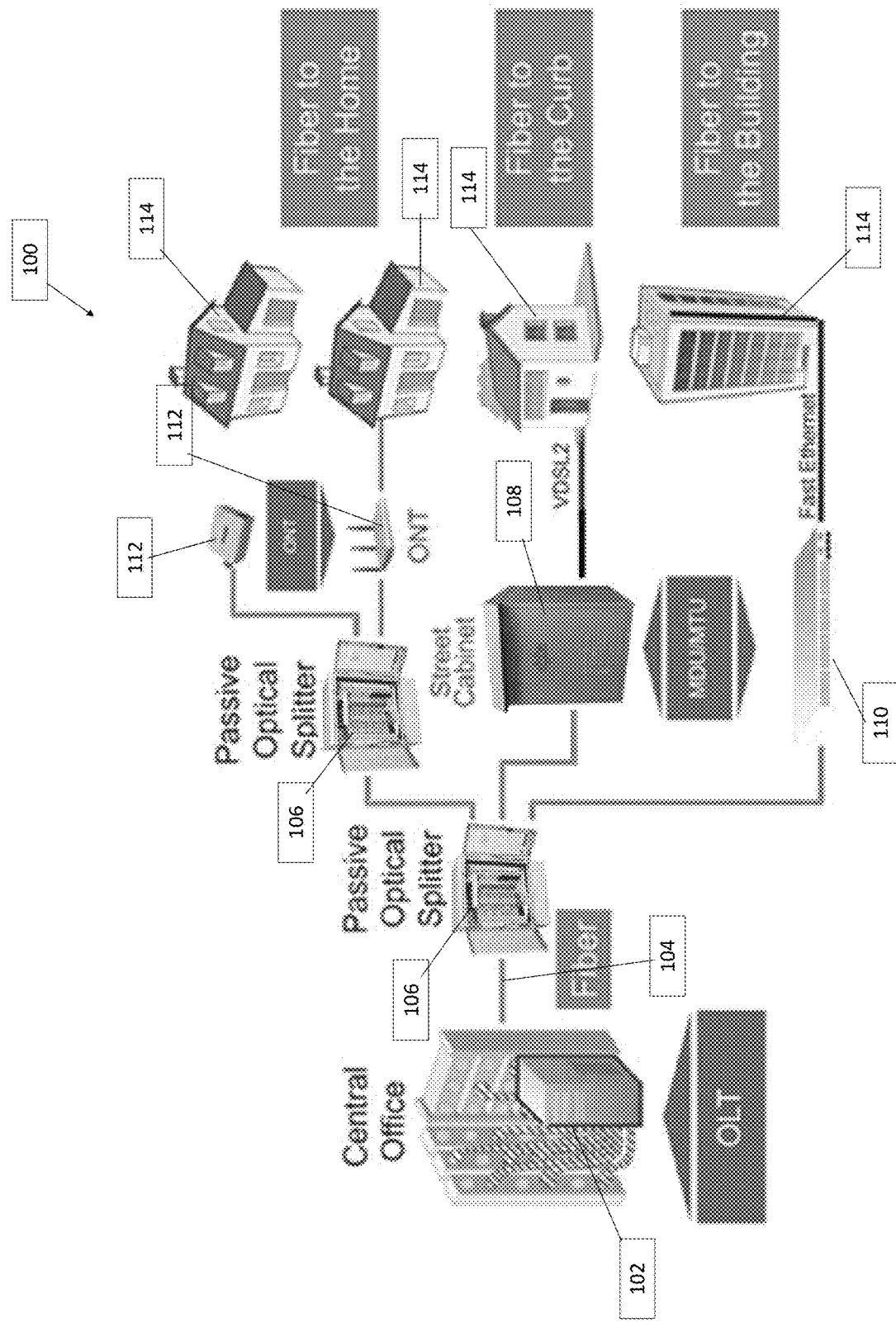
FIG. 1 is an illustration of a schematic view of an exemplary fiber optic network according to an exemplary implementation of the present disclosure.

For the purposes of promoting an understanding of the principles of the invention, reference will now be made to certain implementations, or examples, illustrated in the drawings and specific language will be used to describe the same. It will nevertheless be understood that no limitation of the scope of the invention is thereby intended. Any alterations and further modifications in the described implementations, and any further applications of the principles of the invention as described herein are contemplated as would normally occur to one skilled in the art to which the invention relates.

FIG. 1 is a schematic view of an example fiber optic network 100. The fiber optic network 100 may be utilized to carry data, such as Internet service, television services, phone services, or other services that may be carried over or utilize a fiber optic network to a data consumer, such as a customer. In the example embodiment, a central distribution office 102, or optical line terminal (OLT) provides light signals to a plurality of fiber optic cables 104. The light signals travel through the fiber optic cables 104 to a passive optical splitter 106. The passive optical splitter 106 splits the light signals among a plurality of fiber optic cables 104 leading to at least one of another passive optical splitter 106, a street cabinet 108, and a multi-dwelling unit (MDU) 110. Fiber optic cable 104 exiting the second passive optical splitter 106 may be routed to at least one of a modem, an optical network terminal (ONT), or an optical master unit (OMU), 112 and a wireless ONT 112 to be used by a customer 114, for example. Fiber optic cable 104 exiting the street cabinet 108 may be routed directly to a customer 114. The MDU 110 may provide a plurality of services to a plurality of customers 114, which may include a single-family home residence, apartments, condominiums, offices, other tenants, or other types of customers. In some implementations, the plurality of services may be provided to separate floors in an office building or separate offices in an office building.

Figure 2:
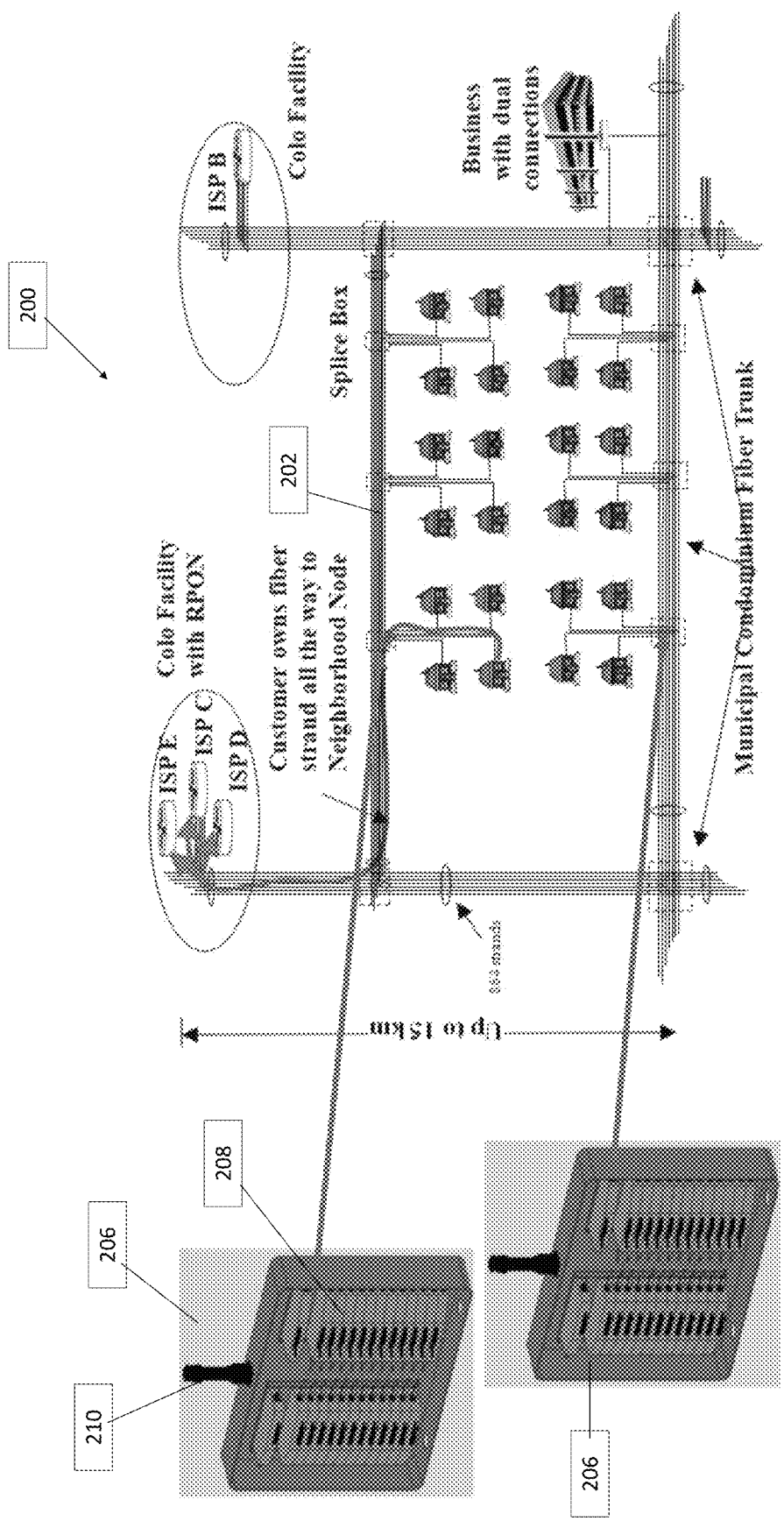
FIG. 2 is an illustration of a schematic view of another exemplary fiber optic network according to an exemplary implementation of the present disclosure.

FIG. 2 is a schematic view of another example fiber optic network 200. A plurality of fiber optic cables 202 extend between a plurality of service locations 204. In the example embodiment, a distribution bank 206, which may be enclosed in a distribution box or other enclosure, is positioned at each branch of the plurality of fiber optic cables 202. The distribution banks 206 are configured to retain a plurality of fiber optic connectors 208, each configured to facilitate rapid and efficient switching service to the service locations 204 from a disconnected condition to a connected condition without requiring splicing or other modification of the fiber optic cables 202. Additionally, the fiber optic connector 208 may facilitate switching between service providers without requiring splicing or other type of modification of the fiber optic cables 202.

Figure 3:
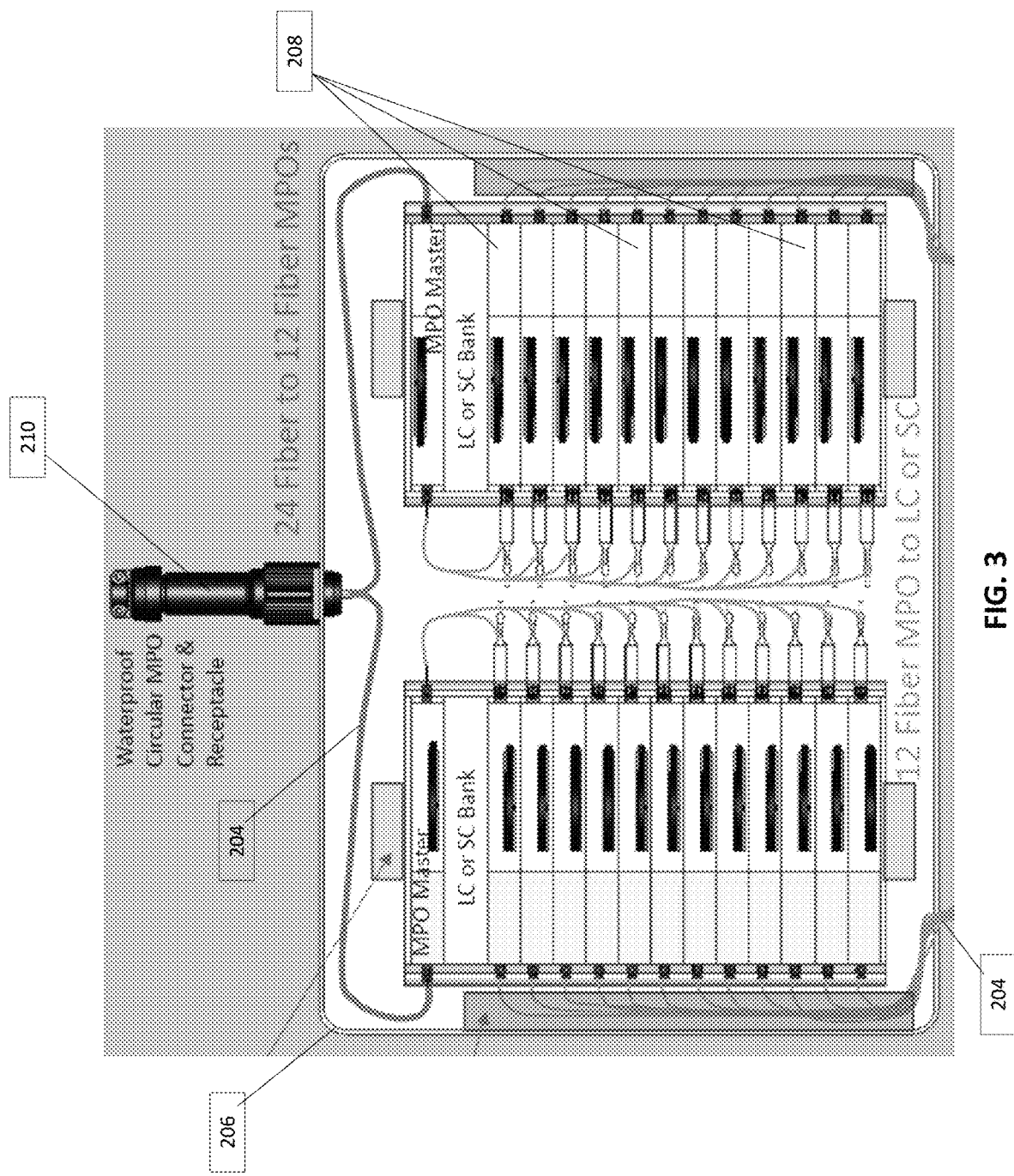
FIG. 3 is an illustration of a front view of an exemplary distribution bank that may be used with the fiber optic network shown in FIG. 2 according to an exemplary implementation of the present disclosure.
Figure 4:
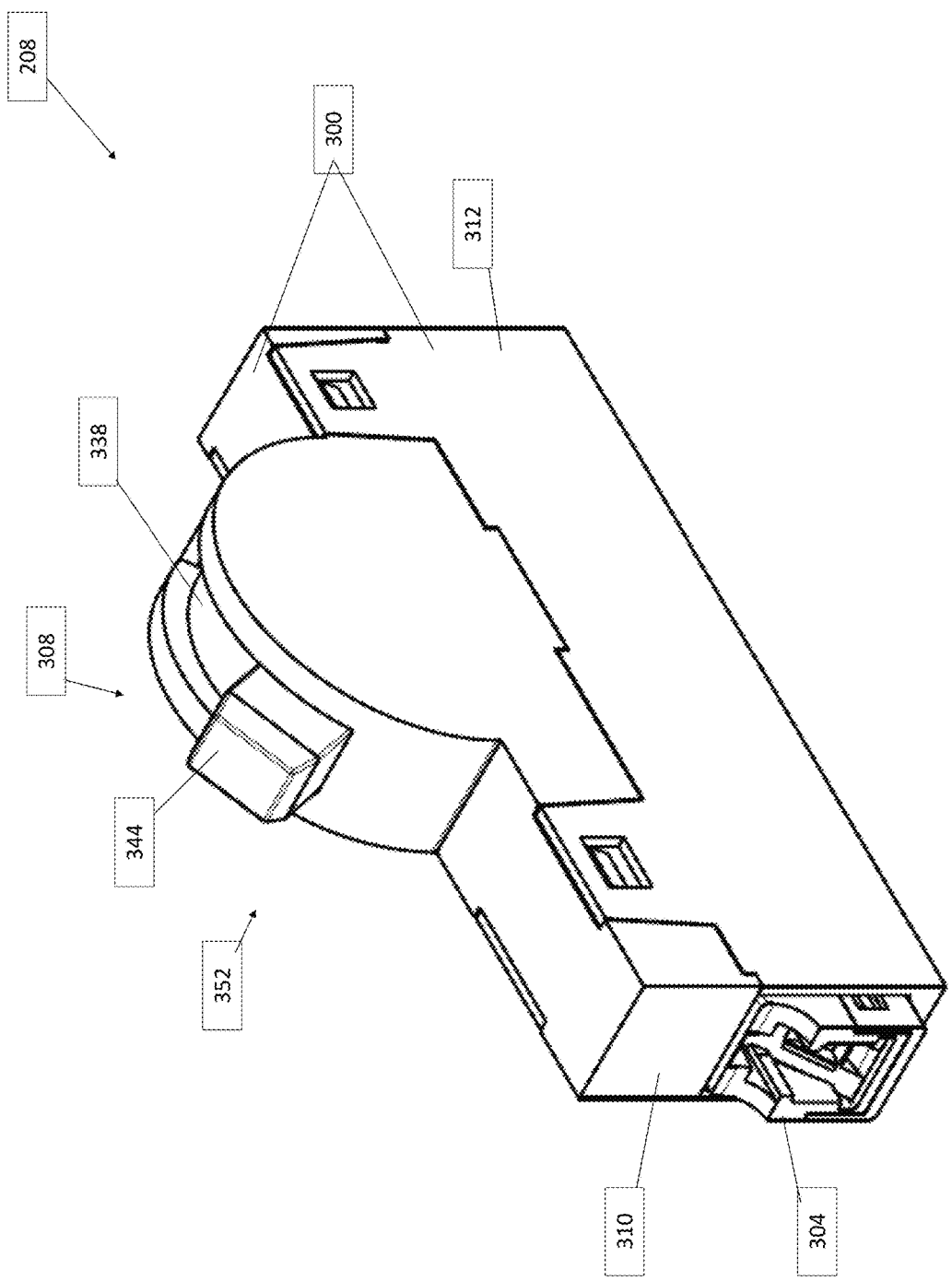
FIG. 4 is an illustration of a perspective view of an exemplary fiber optic connector that may be used with the distribution bank shown in FIG. 3 according to an exemplary implementation of the present disclosure
Figure 5:
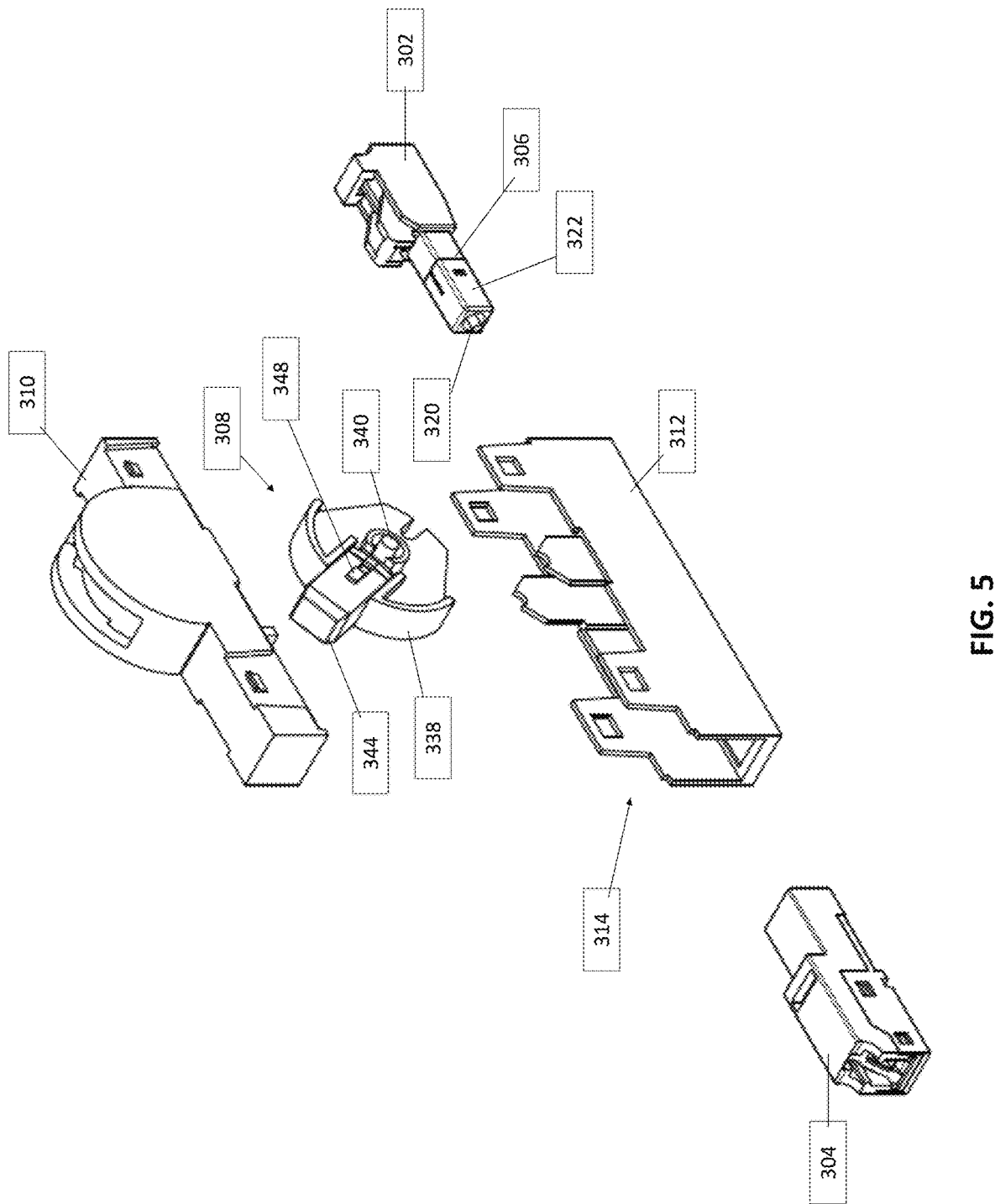
FIG. 5 is an illustration of an exploded perspective view of the exemplary fiber optic connector shown in FIG. 4 according to an exemplary implementation of the present disclosure.

FIG. 3 is a front view of one of the distribution banks 206 illustrated in FIG. 2 illustrating a plurality of fiber optic connectors 208 grouped together within the distribution bank 206. In the example embodiment, fiber optic cables 202 enter the distribution bank 206 through a connector 210, which may be waterproof, coupled to the distribution bank 206 and are distributed to the plurality of fiber optic connectors 208 for ease of connection/disconnection of service.

Turning now to FIGS. 4-7, the fiber optic connector 208 includes a body 300, an input coupling 302, an output coupling 304, a shuttle 306, and a selector 308. In this example, the body 300 includes a top cassette housing 310 and a bottom cassette housing 312 configured to couple together via a snap-fit connection, defining an inner cavity 314 therebetween. The output coupling 304 is positioned opposite the input coupling 302, and each of the output coupling 304 and the input coupling 302 extends through a portion of the bottom cassette housing 312. The selector 308 is connected to the shuttle 306 and extends through a portion of the top cassette housing 310.

Figure 6:
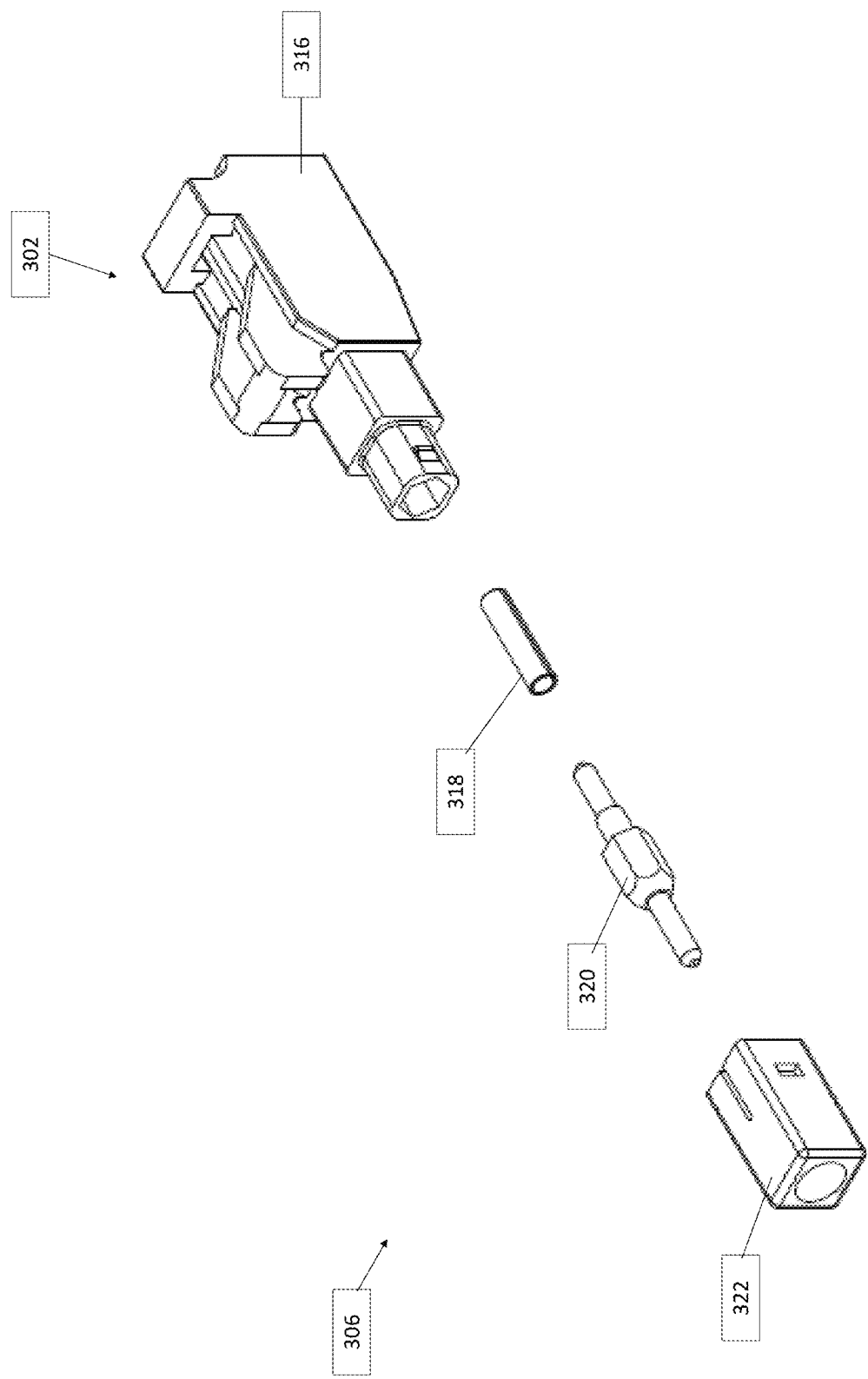
FIG. 6 is an illustration of an exploded perspective view of an exemplary input coupling and an exemplary shuttle that may be used with the exemplary fiber optic connector shown in FIG. 4 according to an exemplary implementation of the present disclosure.

FIG. 6 illustrates an exploded view of the shuttle 306 and the input coupling 302. In this embodiment, the shuttle 306 comprises a body, such as a connector body that physically displaces in an axial direction toward and away from the output 304. In the implementation shown, the shuttle translates within the bottom cassette housing 312 to place the fiber optic of the output coupling 304 in optical communication with the fiber optic of the input 302. Depending on the implementation, the shuttle 306 is a body that may be physically displaced, either axially, laterally, or at an oblique angle, to optically connect the input coupling 302 and the output coupling 304. Further, in this embodiment, the shuttle 306 and the input coupling 302 are coupled together and operate as a single assembly. Additionally, in this embodiment, the shuttle 306 and the input coupling 302 include a connector housing 316, a split sleeve 318, a ferrule 320, and a coupling sleeve 322. The coupling sleeve 322 is configured to be positioned over the ferrule 320 in a snap-fit relationship with the connector housing 316 such that the ferrule 320 is retained within the connector housing 316. The connector housing 316 is sized and configured to receive a fiber optic cable including at least one of small form factor (SFF) connector and a multi-fiber connector. In some implementations, the connector housing 316 may be configured to receive SFF connectors including MT-RJ connectors, VF-45 connectors, LC connectors, Opti-Jack connectors, SC-DC connectors, and SC-QC connectors, for example. In some implementations, the connector housing 316 may be configured to receive multi-fiber connectors including multi-fiber push-on (MPO) connectors, for example. In additional implementations, the connector housing 316 may be sized and configured to receive any type of connector that facilitates operation of the fiber optic connector 208 as described herein.

Figure 7:
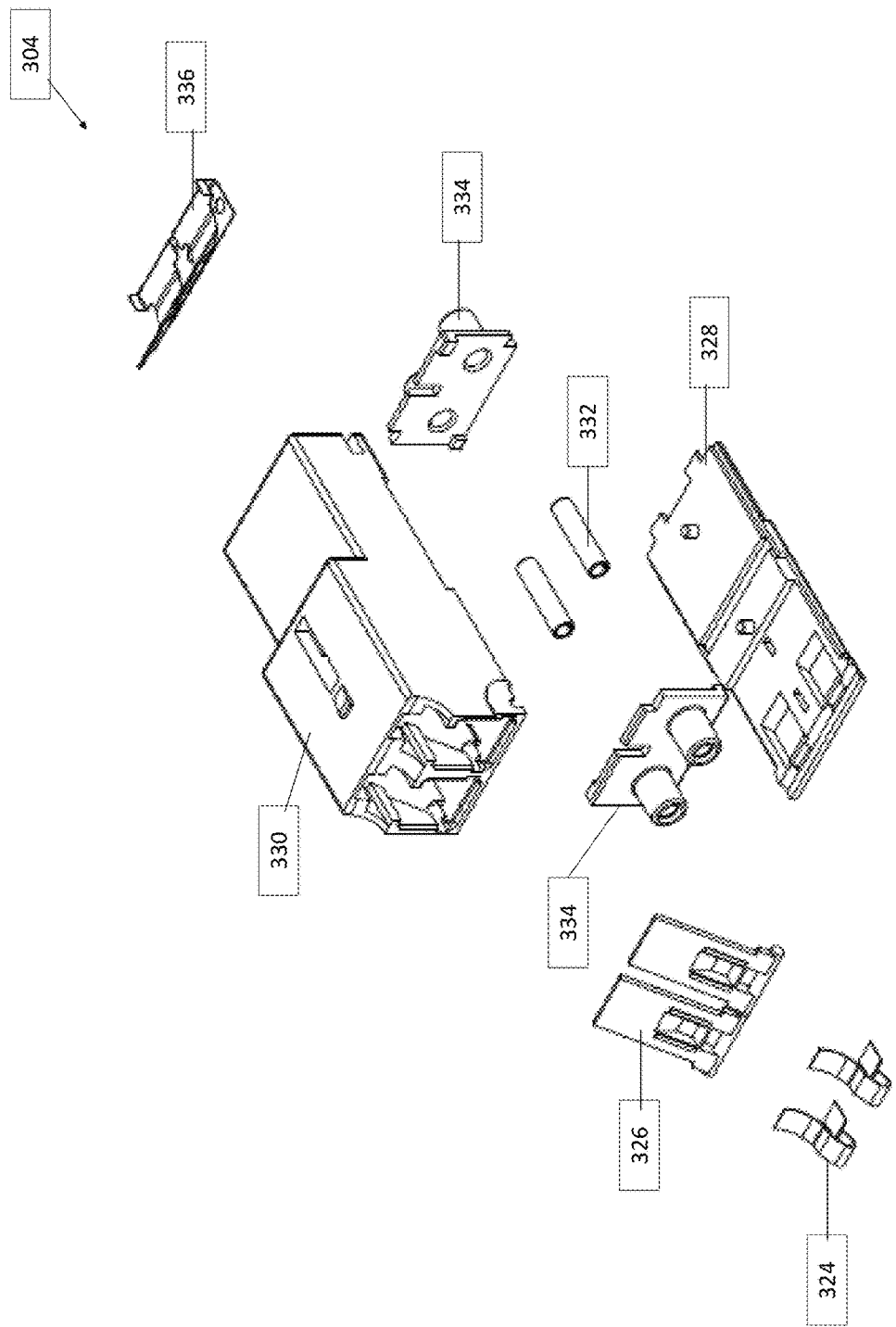
FIG. 7 is an illustration of an exploded perspective view of an exemplary output coupling that may be used with the exemplary fiber optic connector shown in FIG. 4 according to an exemplary implementation of the present disclosure.

FIG. 7 shows an exploded view of output coupling 304. In this implementation, the output coupling 304 is a LC-style duplex adapter and includes springs 324, dust protection shutters 326, a bottom housing 328, a top housing 330, split sleeve 332, an inner housing 334, and light protection shutters 336. In this embodiment, the top housing 330 of the output coupling 304 may be sized and configured to receive SFF connectors including MT-RJ connectors, VF-45 connectors, LC connectors, Opti-Jack connectors, SC-DC connectors, and SC-QC connectors, for example. In some implementations, the output coupling 304 may be configured to receive multi-fiber connectors including multi-fiber push-on (MPO) connectors, for example. In additional implementations, the output coupling 304 may be sized and configured to receive any type of connector that facilitates operation of the fiber optic connector 208 as described herein.

Figure 8:
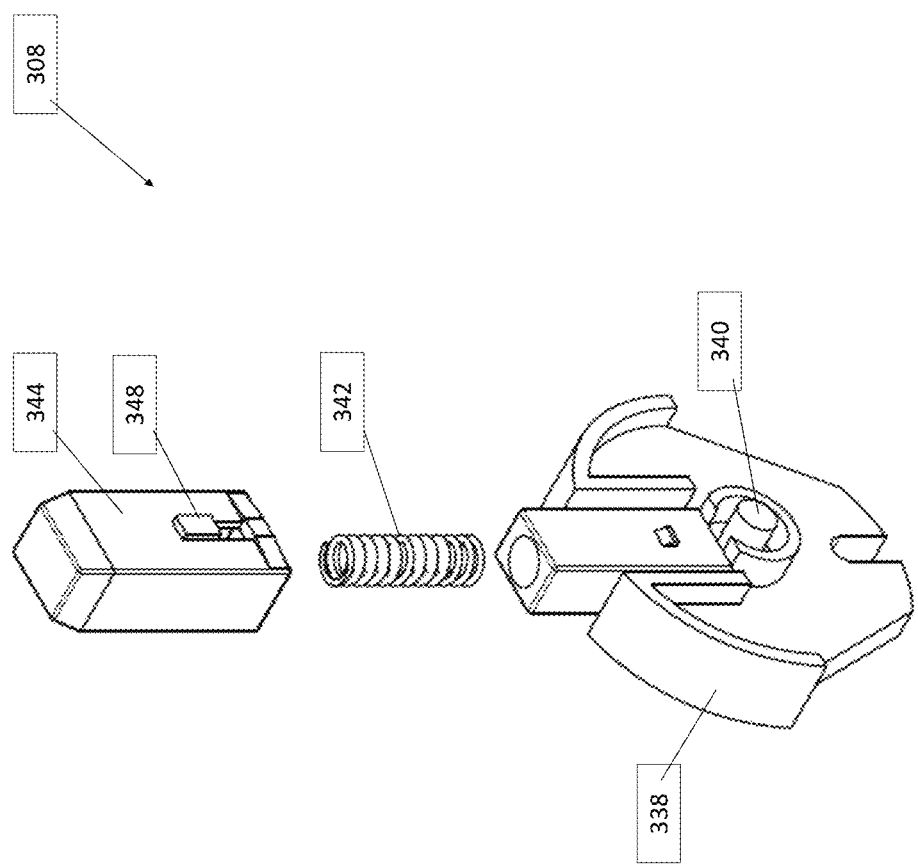
FIG. 8 is an illustration of an exploded perspective view of an exemplary selector that may be used with the exemplary fiber optic connector shown in FIG. 4 according to an exemplary implementation of the present disclosure.

In this embodiment, with reference to FIG. 8, the selector 308 includes a lever 338, a rotation rod 340, a biasing member 342, and a lever cap 344. The top cassette housing 310 includes an internal cam profile 346 (shown in FIGS. 9A-9E) configured to interface with a cam 348 of the lever cap 344, as will be discussed further. The biasing member 342 is received within a cavity of the lever 338 and is retained within the cavity by the lever cap 344. The lever cap 344 is configured to be received along an outer profile of a portion of the lever 338 defining the cavity. The biasing member 342 exerts a force against the lever cap 344, biasing the lever cap 344 radially outward. The rotation rod 340 interfaces with the top cassette housing 210 and the lever 338 rotates about the rotation rod 340.

FIGS. 9A-9E illustrate a partial schematic view of the selector 308 in a plurality of operational positions. In this implementation, the selector 308 may be a toggle switchable between two or more distinct positions that optically connect the input couplings 302 and output couplings 304 of the fiber optic connector 208. With reference to FIGS. 8 and 9A-9E, the selector 308 is configured to move between an "on" position 350 and an "off" position 352, respectively representing an optically connected condition and an optically disconnected position. In this embodiment, the shuttle 306 is coupled to the input coupling 302, and moving the selector from the off position 352 to the on position 350 causes the shuttle 306 and the input coupling 302 to move from a disconnected position 354 to a connected position 356. More specifically, to move the lever 338 from the off position 352 (as shown in FIG. 9A) to the on position 350 (as shown in FIG. 9E), the lever cap 344 is depressed radially inwardly such that the cam 348 is radially inward of an adjacent transition portion of the internal cam profile 346 (as shown in FIG. 9B), allowing the lever 338 to be rotated towards the on position 350 (as shown in FIG. 9C). Once the lever 338 is in the on position 350 (as shown in FIG. 9D), any radially inward force applied to the lever cap 344 may be released, causing the lever cap 344 to extend radially outwardly due to a radially outward force exerted on the lever cap by the biasing member 342 (as shown in FIG. 9E). The cam 348 will come to rest against the on position 350 portion of the internal cam profile 346, causing the selector 308 to be locked in the on position 350. To move the selector 308 from the on position 350 to the off position 352 the reverse is done.

Figure 10A:
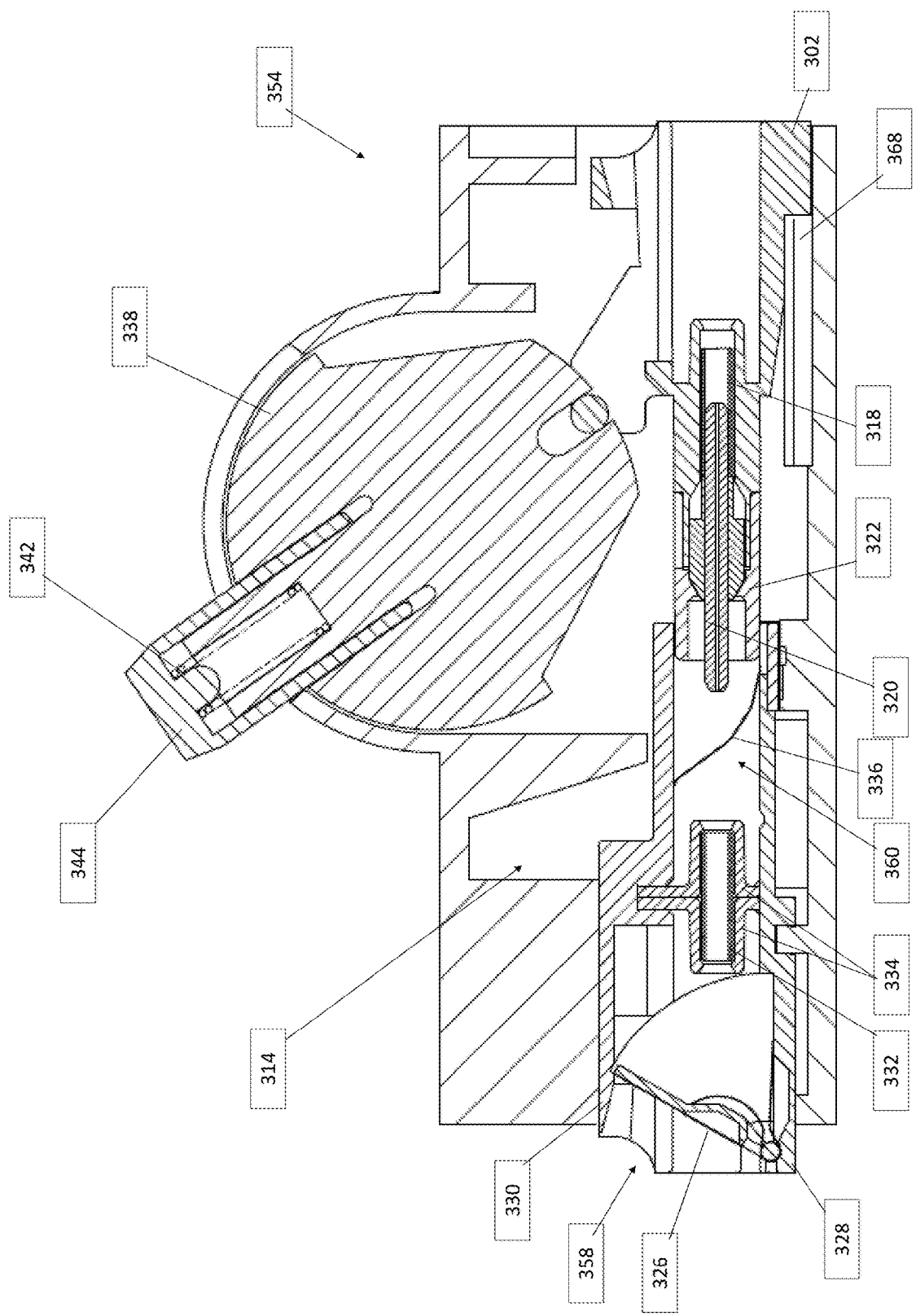
FIG. 10A is an illustration of a cross sectional side view of the exemplary fiber optic connector shown in FIG. 4 in a disconnected position according to an exemplary implementation of the present disclosure.

FIGS. 10A-10D illustrate cross sectional views of the fiber optic connector 208 in a plurality of operational configurations. With reference to FIG. 10A, the selector 308 is in the on position 350 and the shuttle 306 is in the disconnected position 354. Additionally, no fiber optic cables have been received by either of the input coupling 302 or the output coupling 304. The dust protection shutter 326 is in an extended position 358 and is biased towards the extended position 358 by the spring 324. In this implementation, the dust protection shutter 326 is configured to inhibit an intrusion of dust and other debris into the inner cavity 314 when a fiber optic output cable 364 is not present within output coupling 304. In some implementations, a dust protection shutter 326 may be positioned proximate an exterior opening of the input coupling 302. Further, with reference to FIG. 10A, the light protection shutter 336 is in a blocked position 360 that inhibits a transmission of light through the output coupling 304.

Figure 10B:
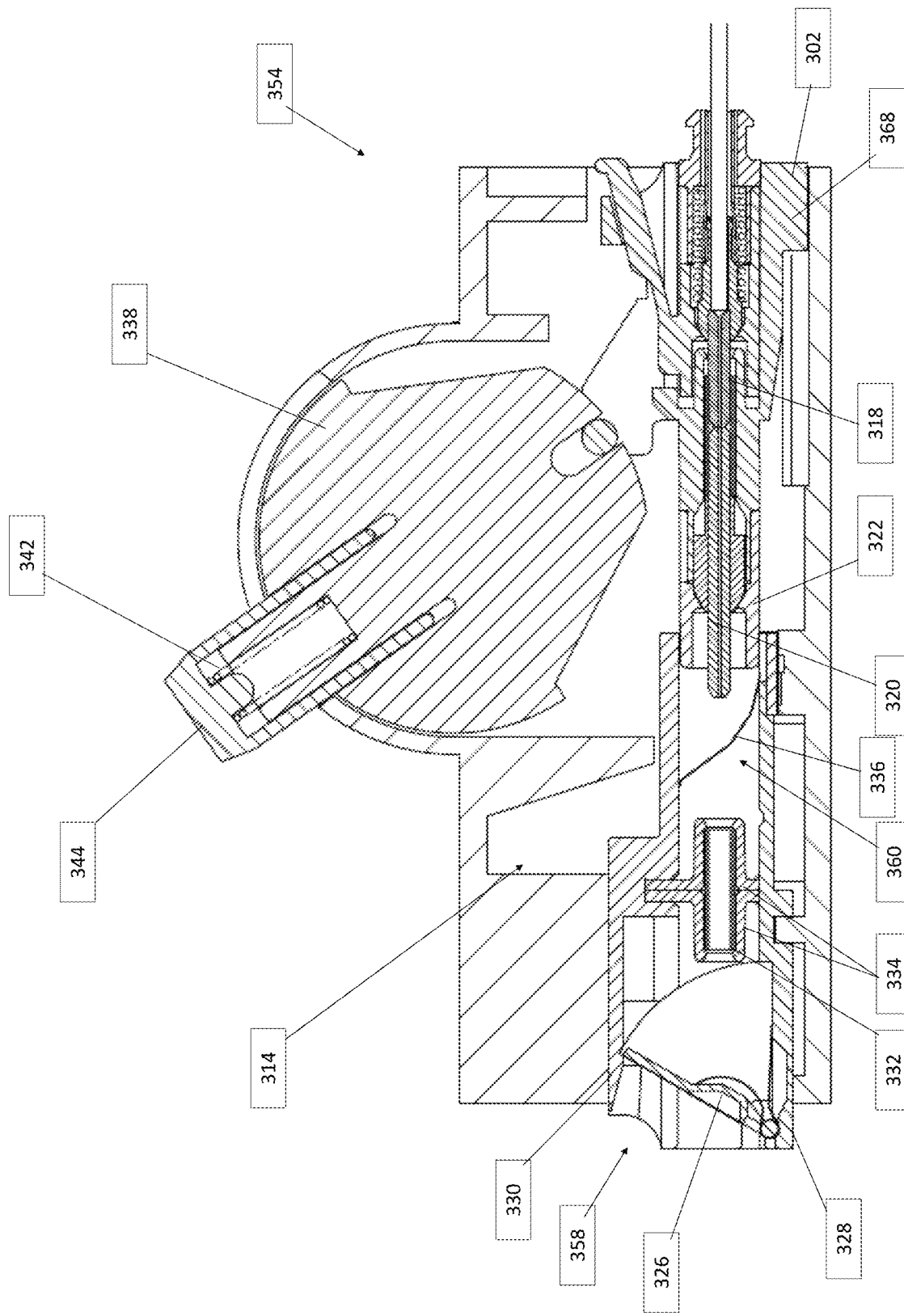
FIG. 10B is an illustration of a cross sectional side view of the exemplary fiber optic connector shown in FIG. 4 in a disconnected position illustrating an exemplary fiber optic input cable according to an exemplary implementation of the present disclosure.

FIG. 10B shows the fiber optic connector 208 with the selector 308 in the off position 352 and the shuttle 306 in the disconnected position 354. A fiber optic input cable 362 is received within the connector housing 316, and the split sleeve 318 and the ferrule 320 are configured to cooperate with the fiber optic input cable 362 to facilitate an optical connection between the ferrule 320 and the fiber optic input cable 362. As illustrated in FIG. 10B, a fiber optic output cable 364 has not been received within the top housing 330 of the output coupling 304 in FIG. 10B.

Figure 10C:
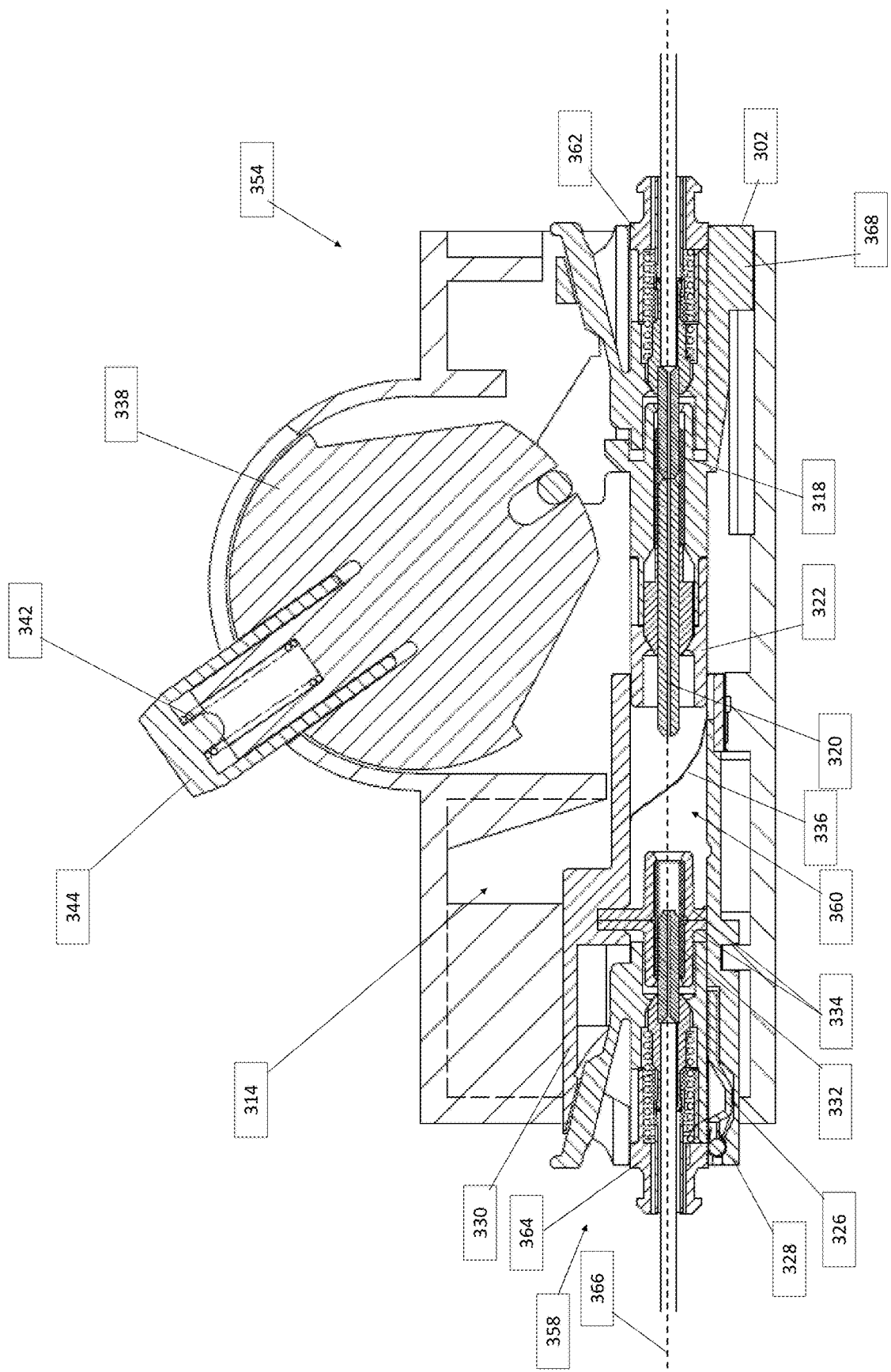
FIG. 10C is an illustration of a cross sectional side view of the exemplary fiber optic connector shown in FIG. 4 in a disconnected position illustrating the exemplary fiber optic input cable and an exemplary fiber optic output cable according to an exemplary implementation of the present disclosure.

FIG. 10C illustrates the fiber optic connector 208 with the selector 308 in the off position 352, the shuttle 306 in the disconnected position 354, a fiber optic input cable 362 received by the connector housing 316, and a fiber optic output cable 364 received by the top housing 330. As shown in FIG. 10C, the dust protection shutter 326 has been rotated to away from the extended position 358 as compared to FIGS. 10A-10B as a result of the fiber optic input cable 362 being received by the top housing 330.

Figure 10D:
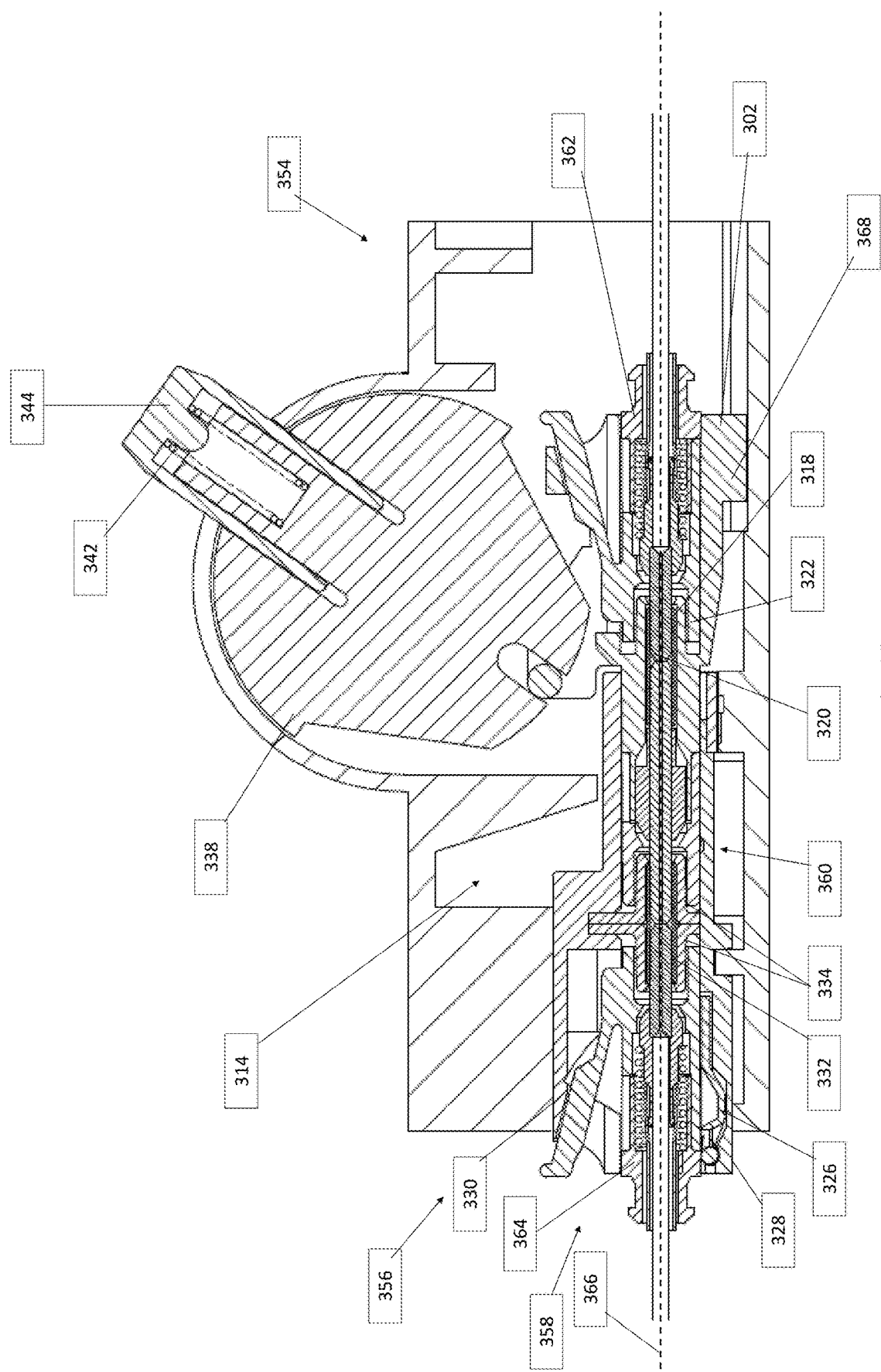
FIG. 10D is an illustration of a cross sectional side view of the exemplary fiber optic connector shown in FIG. 4 in a connected position illustrating the exemplary fiber optic input cable and the exemplary fiber optic output cable according to an exemplary implementation of the present disclosure.

FIG. 10D illustrates the fiber optic connector 208 with the selector 308 in the on position 350 and the shuttle 306 in the connected position 356. More specifically, the shuttle 306 and input coupling 302 have been caused to move longitudinally by the selector 308 along a connector axis 366 of the fiber optic connector 208 such that the ferrule 320 of the shuttle 306 is coupled in optical communication with the fiber optic input cable 362 and the fiber optic output cable 364. The position of the ferrule 320 in the connected position 356 facilitates a transmission of light between the fiber optic input cable 362 and the fiber optic output cable 364.

With reference to FIG. 10D, in this implementation, a portion of the connector housing 316 is configured to interface with a portion of the input coupling 302. More specifically, a keyway 368 extends parallel to the connector axis 366 within the bottom cassette housing 312 and interfaces with the connector housing 316 to slidably retain the connector housing 316 between the connected position 356 and the disconnected position 354. Additionally, advancement of the shuttle 306 and the input coupling 302 to the connected position 356 causes the light protection shutters 336 to deflect away from the connector axis 366 to further facilitate the transmission of light along the connector axis 366 between the fiber optic input cable 362 and the fiber optic output cable 364. A reverse of the process described above may be performed to optically disconnect the fiber optic input cable 362 and the fiber optic output cable 364.

Figure 11:
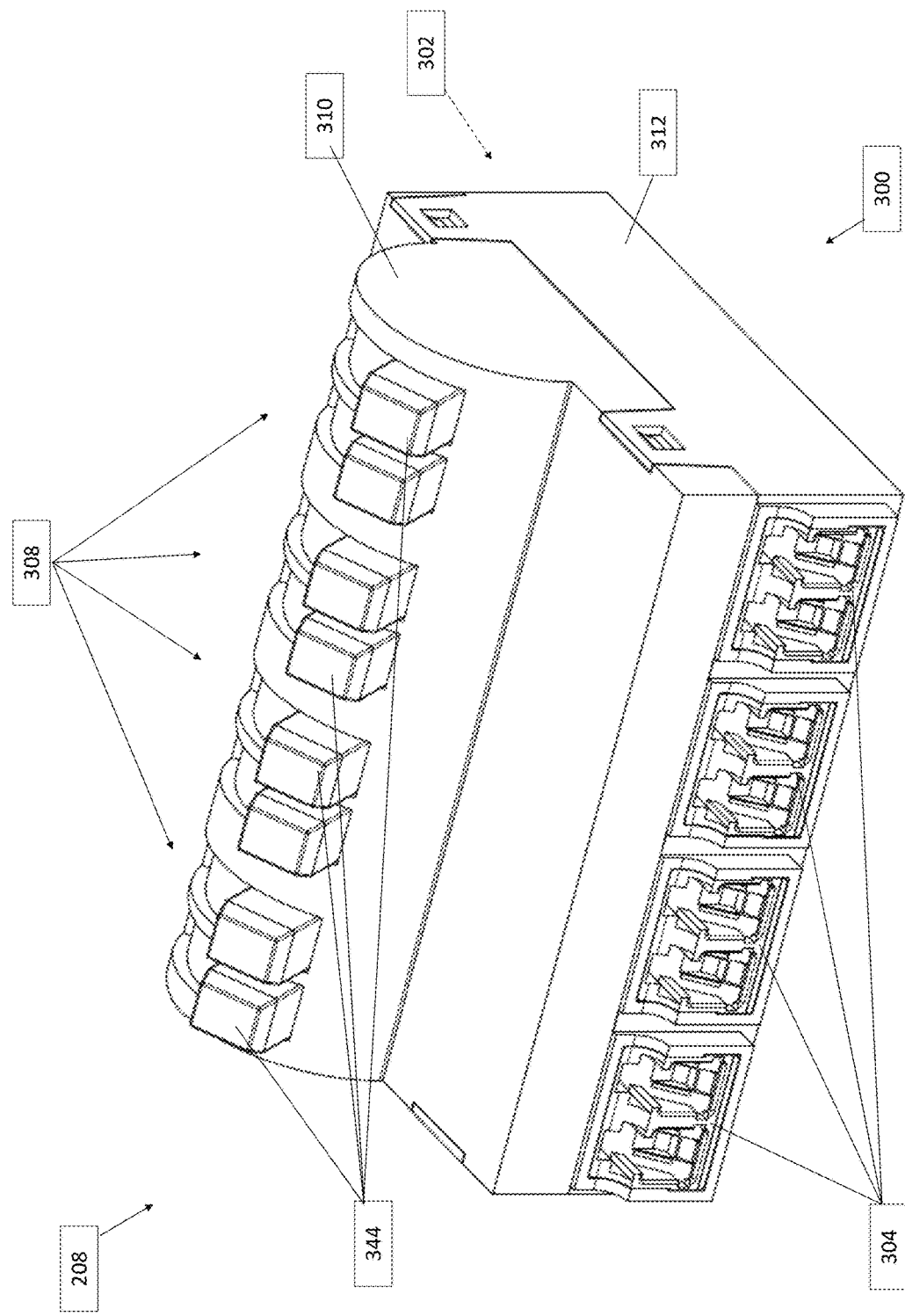
FIG. 11 is an illustration of a perspective view of an exemplary gang fiber optic connector according to an exemplary implementation of the present disclosure.

FIG. 11 is a perspective view of a gang fiber optic connector 208 including a plurality of each of the input couplings 302, the output couplings 304, and the selectors 308. The gang fiber optic connector 208 may be configured to operate like the fiber optic connector 208, but may be fabricated from a single top cassette housing 310 and a single bottom cassette housing 312, each formed to enclose a plurality of the input couplings 302, a plurality of the output couplings 304, and a plurality of the selectors 308. In this implementation, the gang fiber optic connector 208 is illustrated as including a majority of the components from eight separate fiber optic connectors 208, but it should be understood that the gang fiber optic connector may include any number of the input couplings 302, the output couplings 304, and the selectors 308 that facilitates operation of the gang fiber optic connector 208 as described herein. In some embodiments, a plurality of the fiber optic connectors 208 may be coupled together to form a gang fiber optic connector 208.

Figure 12:
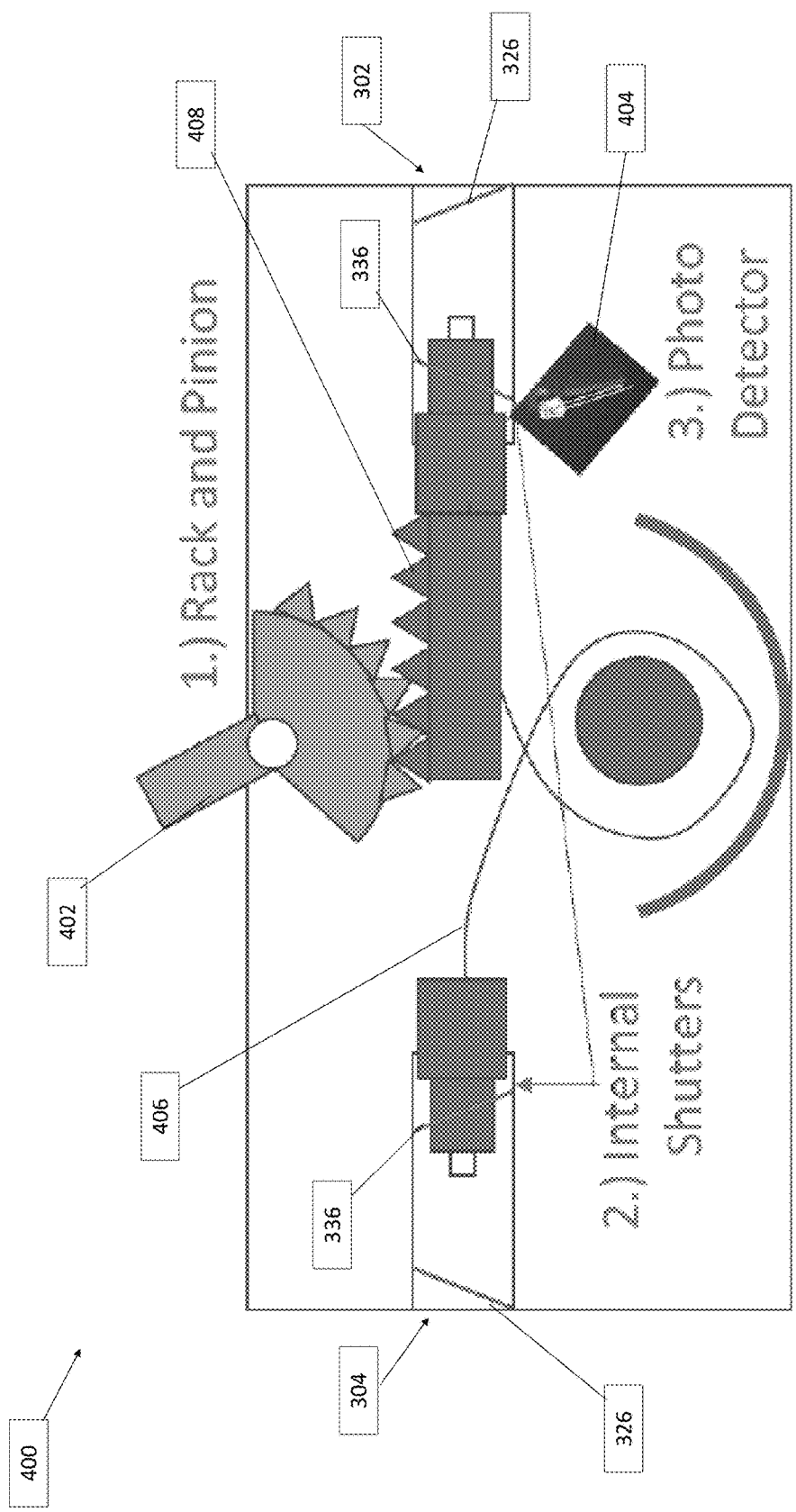
FIG. 12 is an illustration of a cross sectional side view of an exemplary fiber optic connector illustrating an exemplary rack and pinion selector, an exemplary fiber optic coupler, and an exemplary photo detector according to an exemplary implementation of the present disclosure.

FIG. 12 illustrates a fiber optic connector 400 including a rack and pinion selector 402, a photo detector 404, and a fiber optic coupler 406 extending between the shuttle 306 and the output coupling 304. Many of the features of the fiber optic connector 400 are like those described above with reference to the fiber optic connector 208 and will not be repeated here. In this embodiment, the shuttle 306 includes a plurality of teeth 408 configured to interface with the rack and pinion selector 402 such that rotating the rack and pinion selector 402 from an off position to an on position causes the shuttle 306 to advance to the input coupling 302, past a light protection shutter 336, and to an interface with a fiber optic input cable (not shown). The fiber optic coupler 406 is of a length that facilitates coiling the fiber optic coupler 406 within the fiber optic connector 400 such that the shuttle 306 may advance and retract within the fiber optic connector 400 without the fiber optic coupler 406 becoming taunt. The fiber optic connector 400 illustrated in FIG. 12 may be advantageous to applications in which the fiber optic input cable is fixed and/or does not have sufficient length to enable longitudinal movement of the fiber optic input cable as the fiber optic connector 400 is switched from an on position to an off position.

In this embodiment, the photo detector 404 is positioned adjacent the input coupling 302 and is configured to detect a connectivity between the fiber optic input cable and the shuttle 306. In some embodiments, a photo detector 404 may also be positioned adjacent the output coupling 304. In this embodiment, the fiber optic coupler 406 is fixed proximate the output coupling 304. In some embodiments, the shuttle 306 may be moveable relative to the output coupling 304 and the fiber optic coupler 406 may be fixed proximate the input coupling 302.

Figure 13:
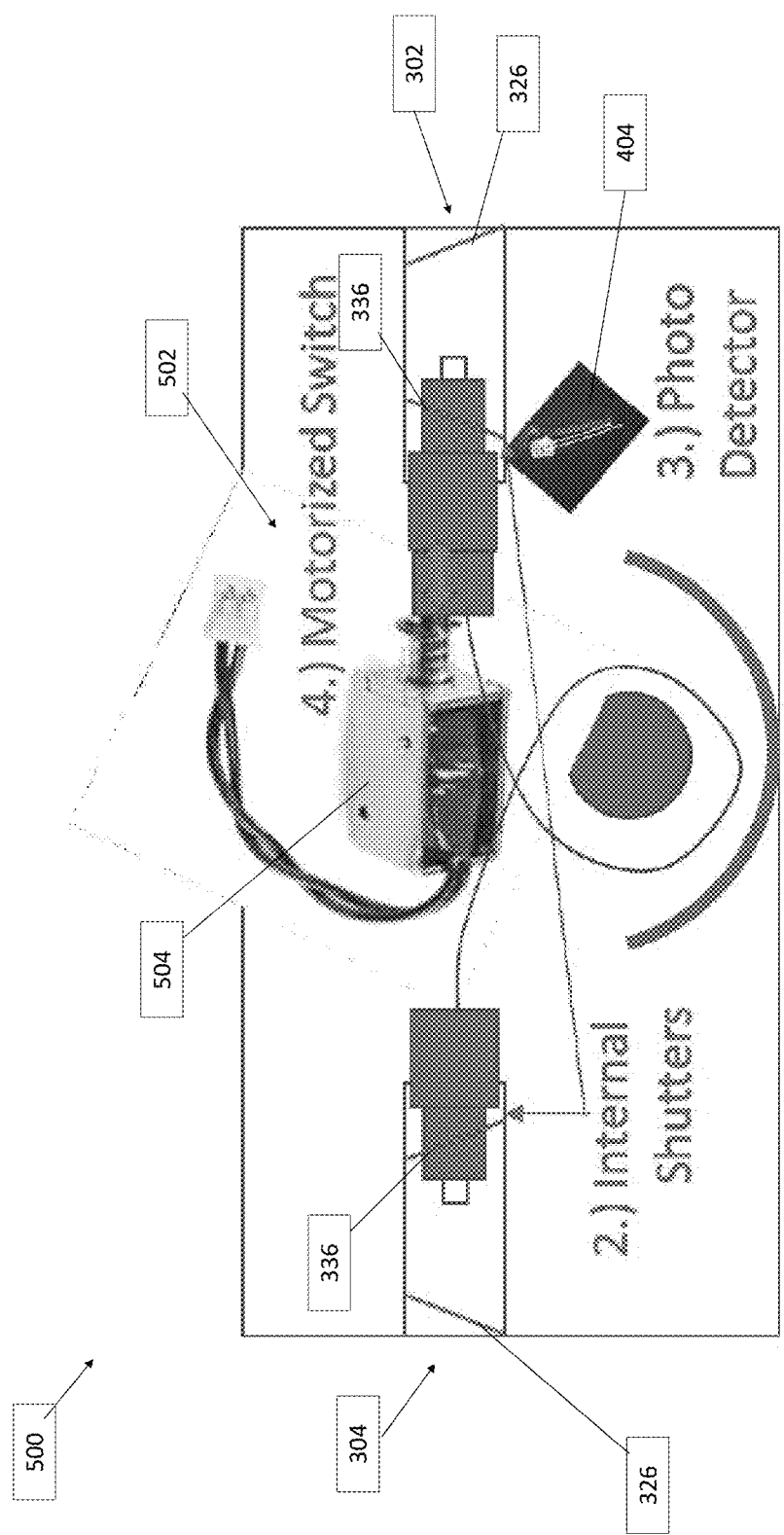
FIG. 13 is an illustration of a cross sectional side view of an exemplary fiber optic connector illustrating an exemplary motorized shuttle according to an exemplary implementation of the present disclosure.

FIG. 13 shows a fiber optic connector 500 including a motorized shuttle 306. Many of the features of the fiber optic connector 500 are like those described above with reference to the fiber optic connector 208 and the fiber optic connector 400 and will not be repeated here. The motorized shuttle 502 includes a shuttle actuator 504 connected to the shuttle 306 and configured to move the shuttle 306 between the connected position and the disconnected position. The shuttle actuator 504 may use at least one of electrical energy, mechanical energy, and potential energy to cause the shuttle 306 to move between the connected position and the disconnected position. In this embodiment, the shuttle actuator 504 is connected to a switch (not shown) that facilitates a user signaling the shuttle actuator 504 to move the shuttle 306 to a desired position. In some embodiments, the shuttle actuator 504 may be communicatively coupled to a command device using at least one of wi-fi, radio, Bluetooth, and other types of signal coupling.

Figure 14:
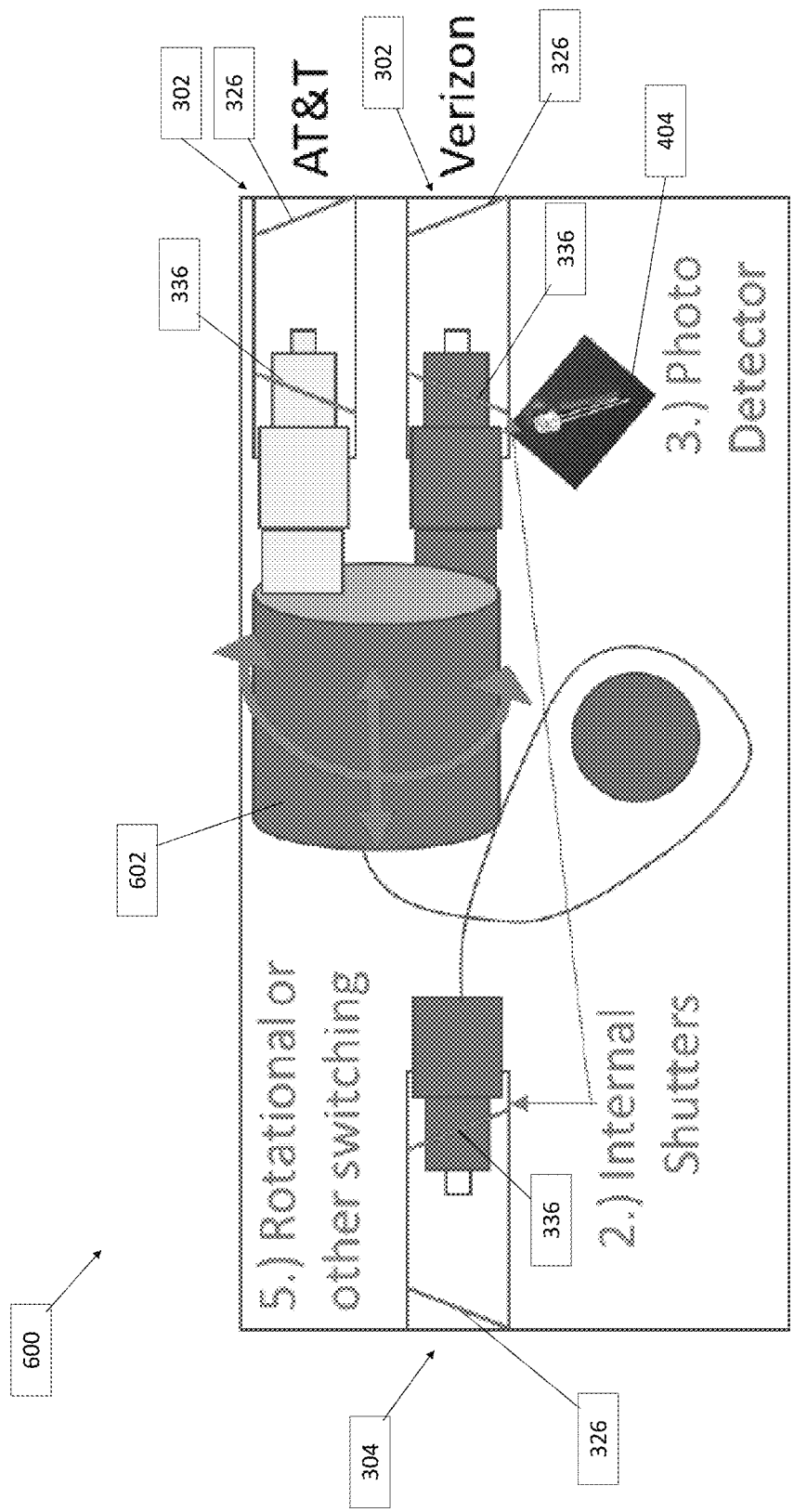
FIG. 14 is an illustration of a cross sectional side view of an exemplary fiber optic connector illustrating exemplary multiple input couplings and an exemplary multi-position shuttle according to an exemplary implementation of the present disclosure.

FIG. 14 shows a fiber optic connector 600 including multiple input couplings 302, a single output coupling 304, and a multi-position shuttle 602. Many of the features of the fiber optic connector 600 are like those described above with reference to the fiber optic connector 208 and the fiber optic connector 400 and will not be repeated here. The multi-position shuttle 602 is configured to facilitate moving between a disconnected position and at least two connected positions, wherein the connected positions may be positions where the multi-position shuttle is connected to one of the multiple input couplings 302. In some embodiments, each of the input couplings 302 is associated with a separate service provider and switching between the input couplings 302 facilitates switching service providers without splicing or cutting the fiber optic cable.

Figure 15:
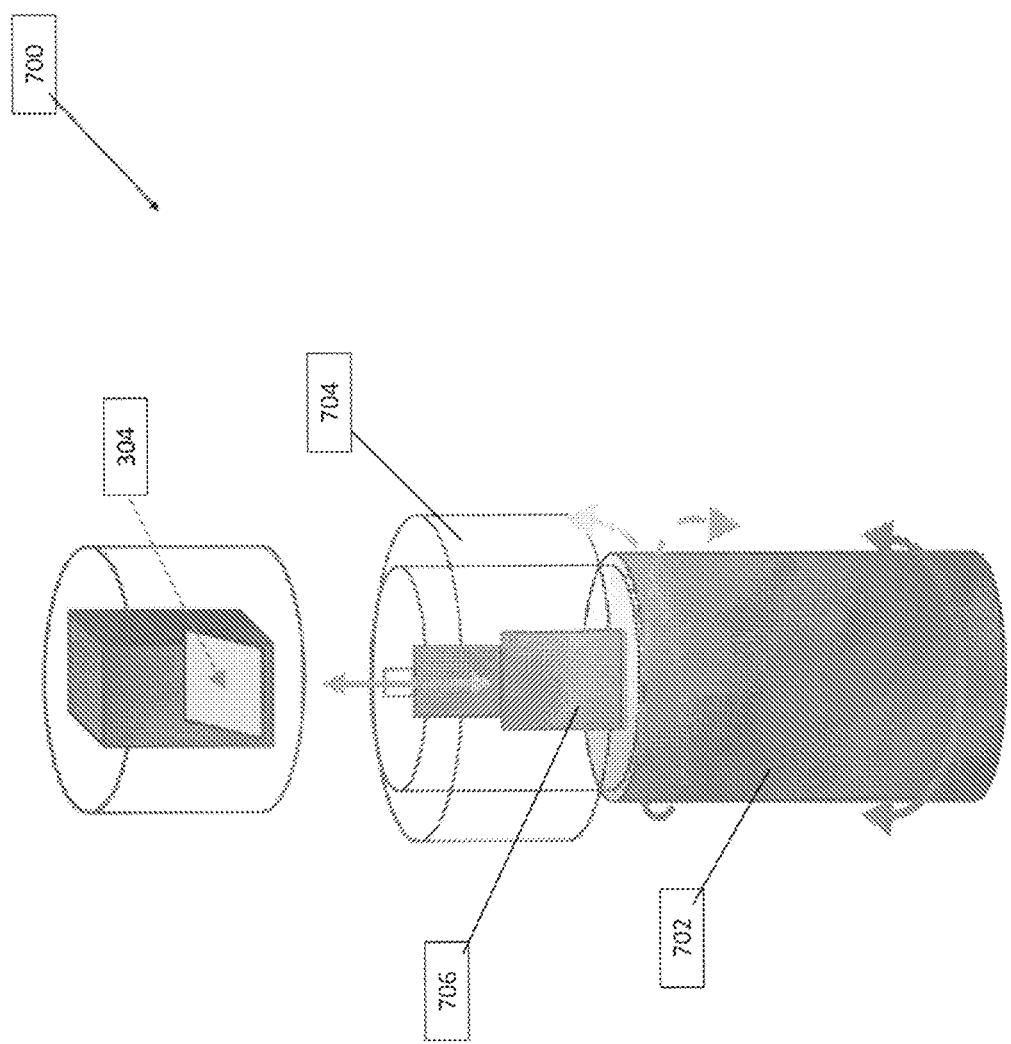
FIG. 15 is an illustration of a perspective view of an exemplary fiber optic connector illustrating an exemplary cylindrical body, an exemplary sealing feature, and an exemplary rotational shuttle according to an exemplary implementation of the present disclosure.

FIG. 15 illustrates a fiber optic connector 700 including a cylindrical body 702, a sealing feature 704, and a rotational shuttle 706. Many of the features of the fiber optic connector 700 are like those described above with reference to the fiber optic connector 208 and the fiber optic connector 400 and will not be repeated here. The cylindrical body 702 is configured to interface with the output coupling 304 via sealing feature 704, which is configured to be threadably received by the output coupling 304. Threading the sealing feature 704 onto the output coupling 304 positions the rotational shuttle 706 proximate the output coupling 304 such that rotating the cylindrical body 702 in a clockwise direction causes the rotational shuttle 706 to advance to an optically connected relationship position with respect to the output coupling 304. The sealing feature may include a gasket, grommet, seal, or other component to inhibit intrusion of liquids and contaminates into the cylindrical body 702 or into an interface between the rotational shuttle 706 and the output coupling 304. Additionally, the sealing feature 704 facilitates rapid coupling and decoupling of the cylindrical body 702 and the output coupling 304.

Figure 16:
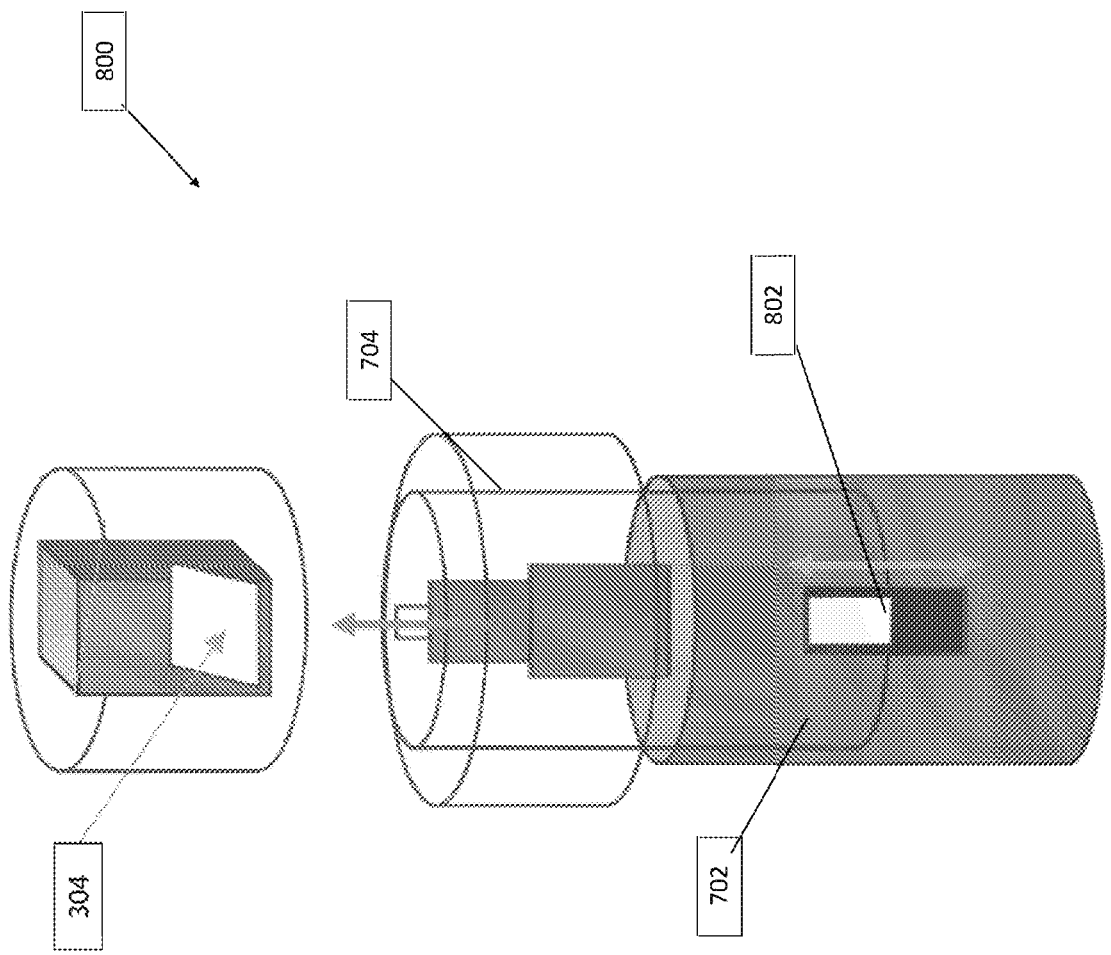
FIG. 16 is an illustration of a perspective view of the exemplary fiber optic connector shown in FIG. 15 illustrating an exemplary slidable selector according to an exemplary implementation of the present disclosure.
Figure 17:
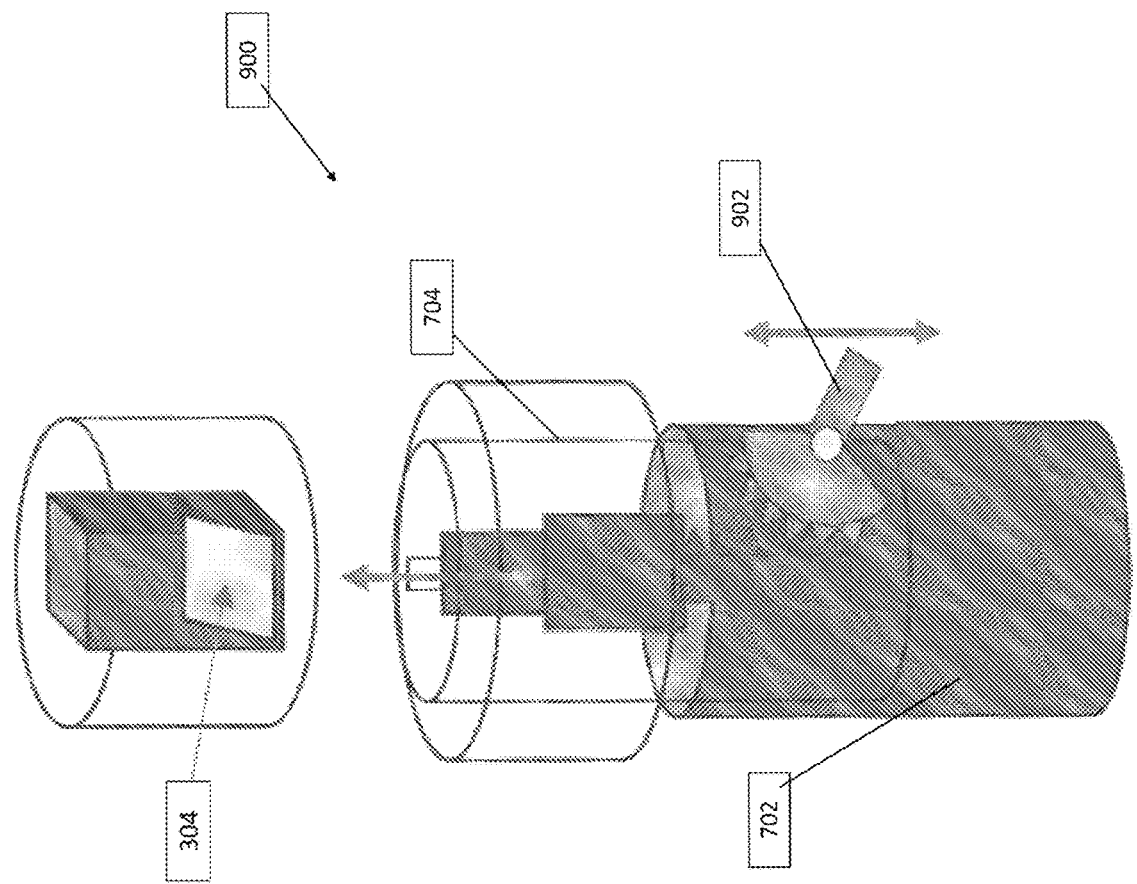
FIG. 17 is an illustration of a perspective view of the exemplary fiber optic connector shown in FIG. 15 illustrating an exemplary rack and pinion selector according to an exemplary implementation of the present disclosure.

FIG. 16 shows a fiber optic connector 800 including a slidable selector 802. FIG. 17 shows a fiber optic connector 900 including a cylindrical rack and pinion selector 902. Many of the features of the fiber optic connectors 800 and 900 are like those described above with reference to the fiber optic connector 208, the fiber optic connector 400, and the fiber optic connector 700, and will not be repeated here. The slidable selector 802 and the rack and pinion selector 902 may be used in any application that facilitates operation of the respective one of the fiber optic connector 800 and the fiber optic connector 900 as described herein.

Figure 18:
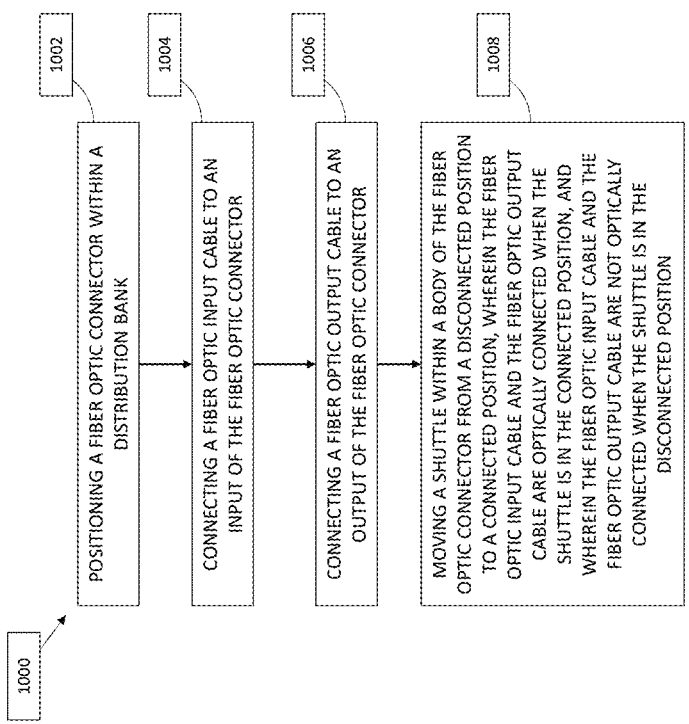
FIG. 18 is a flow chart illustrating a method of connecting fiber optic cables in a network distribution system using fiber optic connector according to an exemplary implementation of the present disclosure.

FIG. 18 is a flow chart illustrating an exemplary method 1000 of connecting fiber optic cables in a network distribution system as disclosed herein. The method may begin by positioning 1002 a fiber optic connector, such as fiber optic connector 208, within a bank. The method may then include connecting 1004, a fiber optic input cable, such as fiber optic input cable 362, to an input, such as input coupling 302, of the fiber optic connector. The method may also include connecting 1006 a fiber optic output cable, such as fiber optic output cable 364, to an output, such as output coupling 304, of the fiber optic connector. Finally, the method may include moving 1008 a shuttle, such as shuttle 306, within a body, such as body 300, of the fiber optic connector from a disconnected position, such as disconnected position 354, to a connected position, such as connected position 356, wherein the fiber optic input cable and the fiber optic output cable are optically connected when the shuttle is in the connected position, and wherein the fiber optic input cable and the fiber optic output cable are not optically connected when the shuttle is in the disconnected position.

The term fiber optic cable as used herein may include a single fiber optic or may include a plurality of fiber optics. Although the terms input coupling and output coupling are used throughout the specification, the disclosure contemplates using what is referred to as the input coupling as the output coupling structure and what is referred to as the output coupling as the input coupling structure. In addition, the shuttle may be associated with the input coupling or the output coupling, depending on the embodiment.

For the purposes of the present disclosure, it will be understood that "optically connected," "optically coupled," and "in optical communication with" may refer to physical contact, or non-physical contact forms of optical communication, arrangement, or configuration of the optical components described herein. For example, a first optical component (e.g., optical fiber, optical connector, coupling, etc.) may be described as optically connected to, or in optical communication with, a second optical component (e.g., optical fiber, optical connector, coupling, etc.), if light signals can be transmitted from one of the optical components to the other optical component. For example, a first optical component may be optically connected to, or in optical communication with, a second optical component even though there is no physical contact between the first optical component and the second optical component. For example, a first optical component may be optically connected to, or in optical communication with, a second optical component even if an intermediate optical component (e.g., a lens) is positioned between the first optical component and the second optical component. In other aspects, the first optical component may be optically connected to, optically coupled to, and/or in optical communication with, a second optical component through physical contact, including direct physical contact and indirect physical contact.

Applicants note that the procedures disclosed herein are merely exemplary and that the systems and method disclosed herein may be utilized for various other connection types and processes. Although several selected implementations have been illustrated and described in detail, it will be understood that they are exemplary, and that a variety of substitutions and alterations are possible without departing from the spirit and scope of the present invention, as defined by the following claims.

We claim:

1. A fiber optic connector comprising:
a body, wherein the body includes a top cassette housing and a bottom cassette housing;
at least one output coupling configured to optically communicate with at least one fiber optic output cable, wherein the at least one output coupling comprises at least one sleeve; and
at least one shuttle moveable within the body between a connected position and a disconnected position, wherein the at least one shuttle is configured to removably couple to at least one fiber optic input cable comprising at least one ferrule, wherein the at least one shuttle is configured to cause movement of the at least one fiber optic input cable along a connector axis to insert the at least one ferrule into the at least one sleeve of the at least one output coupling, wherein the at least one fiber optic input cable and the at least one fiber optic output cable are at least partially within the body and optically connected when the at least one shuttle is in the connected position, and wherein the at least one fiber optic input cable and the at least one fiber optic output cable are not optically connected when the at least one shuttle is in the disconnected position.

2. The fiber optic connector of claim 1, further comprising at least one input coupling configured to optically communicate with the at least one fiber optic input cable, wherein the at least one shuttle includes one of the input coupling and the output coupling.

3. The fiber optic connector of claim 2, wherein at least one of the at least one input coupling and the at least one shuttle is connected to at least one selector, wherein the at least one selector is configured to move between an on position and an off position, wherein the at least one selector is configured to cause the at least one shuttle to move to the connected position when the at least one selector is in the on position, and wherein the at least one selector is configured to cause the at least one shuttle to move to the disconnected position when the at least one selector is in the off position.

4. The fiber optic connector of claim 3, wherein the at least one selector comprises at least one of a rack and pinion selector comprising at least a portion of the at least one shuttle, a rotatable lever connected to the at least one shuttle, a slider selector, and a push button selector.

5. The fiber optic connector of claim 3, wherein the at least one selector includes a locking feature configured to inhibit movement of the at least one selector from one of the on position and the off position when the locking feature is enabled.

6. The fiber optic connector of claim 2, further comprising at least one input coupling shutter extending through at least a portion of the at least one input coupling and at least one output coupling shutter extending through at least a portion of the at least one output coupling, wherein each of the at least one input coupling shutter and the at least one output coupling shutter comprises at least one of a dust protection shutter and a light protection shutter, wherein the dust protection shutter is configured to inhibit an intrusion of dust into the body, and wherein the light protection shutter is configured to inhibit a transmission of light through at least one of the at least one input coupling and the at least one output coupling.

7. The fiber optic connector of claim 1, further comprising at least one shuttle actuator connected to the at least one shuttle and configured to move the at least one shuttle between the connected position and the disconnected position using at least one of electrical energy, mechanical energy, and potential energy.

8. The fiber optic connector of claim 1, further comprising at least one photo detector connected to the fiber optic connector, wherein the at least one photo detector is configured to determine a connectivity between the at least one fiber optic input cable and the at least one fiber optic output cable.

9. The fiber optic connector of claim 2, further comprising at least one fiber optic coupler extending between the at least one shuttle and one of the at least one input coupling and the at least one output coupling.

10. The fiber optic connector of claim 1, further comprising a plurality of connected bodies.

11. The fiber optic connector of claim 1, wherein the body is at least one of cylindrical, rectangular, spherical, and tapered.

12. The fiber optic connector of claim 2, wherein at least one of the at least one input coupling and the at least one output coupling includes a sealing feature configured to interface with a respective one of the at least one fiber optic input cable and the at least one fiber optic output cable to inhibit fluid intrusion into an inner cavity of the body of the fiber optic connector.

13. The fiber optic connector of claim 1, wherein the body includes mounting features configured to interface with a distribution bank mount.

14. The fiber optic connector of claim 2, wherein each of the at least one input coupling and the at least one output coupling comprises at least one of a small form factor connector and a multi-fiber connector.

15. The fiber optic connector of claim 3, wherein the at least one selector is a lever, and wherein the lever includes a rotation rod, a biasing member, and a lever cap.

16. A fiber optic network distribution system comprising:
a distribution bank;
at least one fiber optic input cable comprising at least one ferrule;
at least one fiber optic output cable; and
at least one fiber optic connector positioned within the distribution bank, the at least one fiber optic connector comprising:
a body, wherein the body includes a top cassette housing and a bottom cassette housing;
at least one input coupling configured to optically communicate with at least one fiber optic input cable;
at least one output coupling configured to optically communicate with at least one fiber optic output cable, wherein the at least one output coupling comprises at least one sleeve; and
at least one shuttle moveable within the body between a connected position and a disconnected position, wherein the at least one shuttle is configured to removably couple to the at least one fiber optic input cable, wherein the at least one shuttle is configured to cause movement of the at least one fiber optic input cable along a connector axis to insert the at least one ferrule into the at least one sleeve of the at least one output coupling, wherein the at least one fiber optic input cable and the at least one fiber optic output cable are at least partially within the body and optically connected when the at least one shuttle is in the connected position, and wherein the at least one fiber optic input cable and the at least one fiber optic output cable are not optically connected when the at least one shuttle is in the disconnected position.

17. The fiber optic network distribution system of claim 16, wherein the at least one shuttle includes one of the input coupling and the output coupling.

18. The fiber optic network distribution system of claim 16, wherein at least one of the at least one input coupling and the at least one shuttle is connected to at least one selector, wherein the at least one selector is configured to move between an on position and an off position, wherein the at least one selector is configured to cause the at least one shuttle to move to the connected position when the at least one selector is in the on position, and wherein the at least one selector is configured to cause the at least one shuttle to move to the disconnected position when the at least one selector is in the off position.

19. The fiber optic network distribution system of claim 18, wherein the at least one selector comprises at least one of a rack and pinion selector comprising at least a portion of the at least one shuttle, a rotating lever-arm connected to the at least one shuttle, a slider selector, and a push button selector.

20. The fiber optic network distribution system of claim 18, wherein the at least one selector includes a locking feature configured to inhibit movement of the at least one selector from one of the on position and the off position when the locking feature is enabled.

21. The fiber optic network distribution system of claim 16, further comprising at least one input coupling shutter extending through at least a portion of the at least one input coupling and at least one output coupling shutter extending through at least a portion of the at least one output coupling, wherein each of the at least one input coupling shutter and the at least one output coupling shutter comprises at least one of a dust protection shutter and a light protection shutter, wherein the dust protection shutter is configured to inhibit an intrusion of dust into the body, and wherein the light protection shutter is configured to inhibit a transmission of light through at least one of the at least one input coupling and the at least one output coupling.

22. The fiber optic network distribution system of claim 16, further comprising at least one shuttle actuator connected to the at least one shuttle and configured to move the at least one shuttle between the connected position and the disconnected position using at least one of electrical energy, mechanical energy, and potential energy.

23. The fiber optic network distribution system of claim 16, further comprising at least one photo detector connected to the fiber optic connector, wherein the at least one photo detector is configured to determine a connectivity between the at least one fiber optic input cable and the at least one fiber optic output cable.

24. The fiber optic network distribution system of claim 16, further comprising at least one fiber optic coupler extending between the at least one shuttle and one of the at least one input coupling and the at least one output coupling.

25. The fiber optic network distribution system of claim 16, further comprising a plurality of connected bodies.

26. The fiber optic network distribution system of claim 16, wherein the body is at least one of cylindrical, rectangular, spherical, and tapered.

27. The fiber optic network distribution system of claim 16, wherein at least one of the at least one input coupling and the at least one output coupling includes a sealing feature configured to interface with a respective one of the at least one fiber optic input cable and the at least one fiber optic output cable to inhibit fluid intrusion into an inner cavity of the body of the fiber optic connector.

28. The fiber optic network distribution system of claim 16, wherein the body includes mounting features configured to interface with a distribution bank mount.

* * * * *